United States Patent
Ishihara et al.

(10) Patent No.: US 11,459,029 B2
(45) Date of Patent: Oct. 4, 2022

(54) STEERING SYSTEM AND VEHICLE EQUIPPED WITH SAME

(71) Applicant: NTN CORPORATION, Osaka (JP)

(72) Inventors: Norio Ishihara, Iwata (JP); Atsushi Itou, Iwata (JP); Masato Abe, Atsugi (JP); Yoshio Kano, Atsugi (JP); Makoto Yamakado, Atsugi (JP); Mitsunori Ishibashi, Atsugi (JP)

(73) Assignee: NTN CORPORATION, Osaka (JP)

( * ) Notice: Subject to any disclaimer, the term of this patent is extended or adjusted under 35 U.S.C. 154(b) by 41 days.

(21) Appl. No.: 17/025,176

(22) Filed: Sep. 18, 2020

(65) Prior Publication Data

US 2021/0001921 A1    Jan. 7, 2021

Related U.S. Application Data

(63) Continuation of application No. PCT/JP2019/010105, filed on Mar. 12, 2019.

(30) Foreign Application Priority Data

Mar. 20, 2018 (JP) .............................. JP2018-053064
Sep. 25, 2018 (JP) .............................. JP2018-178253
Mar. 6, 2019 (JP) .............................. JP2019-040354

(51) Int. Cl.
*B62D 6/00* (2006.01)
*B62D 5/00* (2006.01)

(52) U.S. Cl.
CPC ............. *B62D 6/008* (2013.01); *B62D 5/006* (2013.01); *B62D 6/003* (2013.01)

(58) Field of Classification Search
CPC ............. B60W 10/20; B60W 2710/20; B60W 2710/207
See application file for complete search history.

(56) References Cited

U.S. PATENT DOCUMENTS 5,143,400 A * 9/1992 Miller .................... B62D 17/00
                                                   180/413
5,559,698 A * 9/1996 Hwang .................. B62D 7/159
                                                   701/36

(Continued)

FOREIGN PATENT DOCUMENTS

CN    104159809 A    11/2014
CN    106660583 A    5/2017

(Continued)

OTHER PUBLICATIONS

International Preliminary Report on Patentability with Written Opinion of the International Searching Authority dated Oct. 1, 2020 in International Patent Application No. PCT/JP2019/010105.

(Continued)

*Primary Examiner* — Ryan Rink

(57) ABSTRACT

The steering system includes: a first steering device to-steer left and right wheels in a mechanically associated manner by changing an angle of left and right chassis frame components; and a second steering device to drive a supplementary turning actuator to change angles of the wheels relative to the chassis frame components. The second steering device includes a supplementary turning control section to perform a control to cause turning by a steering angle that is a difference between a steering angle determined by a numerical model of vehicle motion on the basis of the steering command angle and the vehicle velocity and an actual steering angle.

11 Claims, 14 Drawing Sheets

(56) References Cited

U.S. PATENT DOCUMENTS

| | | | |
|---|---|---|---|
| 7,520,367 B2 | 4/2009 | Nakatsu et al. | |
| 8,073,592 B2* | 12/2011 | Nishimori | B62D 7/146 |
| | | | 180/404 |
| 9,216,625 B2* | 12/2015 | Ramirez Ruiz | B60G 17/0163 |
| 9,321,482 B2 | 4/2016 | Morikawa | |
| 9,643,644 B2 | 5/2017 | Fujita et al. | |
| 10,246,085 B2 | 4/2019 | Izumi et al. | |
| 10,501,117 B2 | 12/2019 | Ohba et al. | |
| 2002/0022915 A1 | 2/2002 | Chen et al. | |
| 2003/0209866 A1* | 11/2003 | Kwon | B60G 7/003 |
| | | | 280/5.522 |
| 2005/0023179 A1 | 10/2005 | Nakatsu et al. | |
| 2007/0029748 A1 | 2/2007 | Baxter et al. | |
| 2007/0299582 A1* | 12/2007 | Raksincharoensak | |
| | | | B62D 6/003 |
| | | | 701/41 |
| 2008/0167778 A1 | 7/2008 | Tsukasaki et al. | |
| 2008/0184838 A1* | 8/2008 | Hayashi | B62D 5/008 |
| | | | 74/484 R |
| 2009/0248250 A1* | 10/2009 | Yasui | B62D 6/008 |
| | | | 701/42 |
| 2010/0161178 A1 | 6/2010 | Kodaira et al. | |
| 2012/0123643 A1* | 5/2012 | Limpibuntering | B62D 1/286 |
| | | | 701/42 |
| 2013/0075185 A1* | 3/2013 | Sugai | B62D 5/001 |
| | | | 180/402 |
| 2014/0172236 A1* | 6/2014 | Nishikawa | B62D 6/00 |
| | | | 701/42 |
| 2015/0012183 A1* | 1/2015 | Sugai | B62D 5/046 |
| | | | 701/41 |
| 2015/0014952 A1 | 1/2015 | Morikawa | |
| 2015/0217618 A1* | 8/2015 | Dorrestijn | B62D 7/146 |
| | | | 280/5.52 |
| 2015/0224987 A1* | 8/2015 | Tachibana | G08G 1/166 |
| | | | 701/1 |
| 2016/0096550 A1* | 4/2016 | Dames | B60G 7/001 |
| | | | 180/252 |
| 2016/0176437 A1 | 6/2016 | Fujita et al. | |
| 2017/0137059 A1 | 5/2017 | Ohba et al. | |
| 2017/0282971 A1* | 10/2017 | Yanez | B62D 6/06 |
| 2018/0079407 A1 | 3/2018 | Izumi et al. | |
| 2019/0225269 A1* | 7/2019 | Yamazaki | B62D 7/146 |

FOREIGN PATENT DOCUMENTS

| | | |
|---|---|---|
| DE | 10 2004 053 726 A1 | 5/2006 |
| DE | 102012206337 A | 10/2013 |
| JP | 2005-297930 | 10/2005 |
| JP | 2006-56374 A | 3/2006 |
| JP | 2011-016429 A | 1/2011 |
| JP | 2012-111463 A | 6/2012 |
| JP | 2015-117005 A | 6/2012 |
| JP | 2016-118241 A | 6/2016 |
| JP | 6270251 B | 1/2018 |

OTHER PUBLICATIONS

International Search Report dated May 7, 2019 in International Patent Application No. PCT/JP2019/010105.

Extended and Supplementary European Search Report dated Nov. 30, 2021 in European Patent Application No. 19770509.8.

Chinese Office Action dated Jan. 30, 2022 in Chinese Patent Application No. 201980019636.1 (9 pages; 9 pages English translation).

Japanese Office Action dated Jun. 14, 2022 in Japanese Patent Application No. 2019-040354 (5 pages; 5 pages English translation).

* cited by examiner

FOUR-WHEEL MODEL

TWO-WHEEL MODEL (a) VEHICLE TURNING PATH (b) LATERAL ACCELERATION (c) LEFT WHEEL ANGLE (d) RIGHT WHEEL ANGLE

STEERING SYSTEM AND VEHICLE EQUIPPED WITH SAME

CROSS REFERENCE TO THE RELATED APPLICATION

This application is a continuation application, under 35 U.S.C. § 111(a), of international application No. PCT/JP2019/010105, filed Mar. 12, 2019, which is based on and claims Convention priority to Japanese patent application No. 2018-053064, filed Mar. 20, 2018; Japanese patent application No. 2018-178253, filed Sep. 25, 2018; and Japanese patent application No. 2019-040354, filed Mar. 6, 2019, the entire disclosures of which are herein incorporated by reference as a part of this application.

BACKGROUND OF THE INVENTION

Field of the Invention

The present invention relates to a steering system including a typical steering device additionally provided with a mechanism for performing supplementary turning by an angle equal to or less than several degrees so as to improve responsiveness of a vehicle to an operation of a steering wheel by a driver as well as to a vehicle equipped with the same.

Description of Related Art

Conventional general steering devices are configured to change angles of chassis frame components that move in mechanical association with rotation of a steering wheel in order to steer front wheels, and do not have satisfactory responsiveness for causing a vehicle to change a direction of movement in response to an operation of a steering wheel by a driver. Patent Documents 1, 2 propose techniques for improving such responsiveness.

Patent Document 1 is directed to a vehicle behavior control device for controlling a behavior of a vehicle in which front wheels are steered, the device being configured to control the vehicle behavior so as not only to reflect an intention of a driver in the vehicle behavior, but also to further improve attitude stability and ride comfort of the vehicle.

A steering device in Patent Document 1 is configured to transmit rotation of a steering wheel to front wheels and includes a steering-wheel-side mechanism and a wheel-side mechanism configured to steer the front wheels, which is mechanically separate from the steering-wheel-side mechanism.

The steering-wheel-side mechanism is provided with a first steering angle sensor for detecting a rotational steering angle of the steering wheel, and the wheel-side mechanism is provided with a second steering angle sensor for detecting a steering angle corresponding to turning of the front wheels. A steering speed is calculated by use of an output from the first steering angle sensor and an output from the second steering angle sensor. Then, it is determined whether turning of the vehicle has been caused in accordance with a steering operation intentionally made by a driver or in accordance with turning of the front wheels due to disturbance on the basis of the outputs from the first and second steering angle sensors, and a steering speed is set based on the determination result.

Patent Document 2 describes that two motors are used in a single wheel body to adjust both a toe angle and a camber angle of a wheel.

RELATED DOCUMENT

Patent Document

[Patent Document 1] JP Patent No. 6270251
[Patent Document 2] DE 102012206337 A

A configuration using a steer-by-wire system as in Patent Document 1 has a safety problem in that a vehicle may become unable to be operated when, for example, a power source fails during driving.

The mechanism having a supplementary turning function as in Patent Document 2 has a complicated structure because the mechanism is intended to arbitrarily change a toe angle and/or a camber angle of a wheel. In the case of Patent Document 2, use of two motors would not only increase costs because of the increased number of the motors, but also makes the mechanism have a large and complicated structure in order to control both a toe angle and a camber angle within a single wheel.

SUMMARY OF THE INVENTION

In order to solve the above problems, an object of the present invention is to provide a steering system that includes a mechanical mechanism having a simple structure and secured safety and is capable of controlling angles of left and right front wheels in accordance with a vehicle velocity and a steering command angle so as to improve responsiveness of a vehicle to an operation of a steering wheel and/or a steering command from an automatic drive device as well as a vehicle including the same.

Hereinafter, the present invention will be described using reference numerals used in embodiments for the sake of convenience in order to facilitate understanding of the present invention.

A steering system 100 of the present invention includes:
a first steering device 11 configured to change an angle of left and right chassis frame components 6, 6 of a suspension device 12 to which left and right wheels 9, 9 that serve as front wheels of a vehicle 101 are mounted so as to steer the left and right wheels 9, 9 that serve as the front wheels of the vehicle 101 in accordance with a steering command angle $\delta_h$ given by rotation of a steering wheel 200 or an electrical signal, the left and right wheels 9,9 being mechanically associated with each other;
a second steering device 150 configured to drive a supplementary turning actuator 5, 5 provided to each of the left and right wheels 9, 9 to change angles of the wheels 9, 9 relative to the chassis frame components 6, 6 and thereby individually turn the left and right wheels 9, 9; and
a vehicle information detection section 110 configured to detect vehicle information including a vehicle velocity V of the vehicle 101 and the steering command angle $\delta_h$, wherein
the second steering device 150 includes a supplementary turning control section 151 configured to control the supplementary turning actuator 5 so as to perform turning by a steering angle $\delta_2$ for auxiliary turning that is a difference between a steering angle $\delta$ of the front wheels, determined by a numerical model M of vehicle motion on the basis of the information on the steering command angle $\delta_h$ and the vehicle velocity V, and an actual steering angle $\delta_1$ of the front wheels 9, 9 steered by the first steering device 11.

According to this configuration, the first steering device 11 may cause the left and right chassis frame components 6, 6 to move in a mechanically associated manner and to change their angles in accordance with a steering command angle $\delta_h$, and thereby the left and right wheels 9, 9 that are the front wheels are steered along with the chassis frame components 6, 6. For example, the left and right chassis frame components 6 change their angles in mechanical association with rotation of the steering wheel 200 by a driver, and the wheels 9, 9 that are the front wheels are steered along with the chassis frame components 6, 6. This steering is the same as that in a general vehicle. The supplementary turning control section 151 performs a control to cause the second steering device 150 to perform turning in addition to the turning by the steering angle $\delta_1$ performed by the first steering device 11.

In such a case, the second steering device 150 controls the supplementary turning actuator 5 so as to perform turning by a steering angle $\delta_2$ that is a difference between a steering angle $\delta$, determined to be a steering angle providing optimal responsiveness (an ideal steering angle) by the numerical model M of vehicle motion, i.e., a kinetic model, on the basis of the information on a steering command angle $\delta_h$ and a vehicle velocity V, and an actual steering angle $\delta_1$ of the wheels 9, 9 steered by the first steering device 11. That is, the second steering device 150 corrects a wheel angle to a suitable value based on a kinetic model of a vehicle in accordance with a steering command angle $\delta_h$ and a traveling velocity during turning. This makes it possible to improve responsiveness to an operation of a steering wheel and a steering command from an automatic drive device.

Since the second steering device 150 is intended to correct steering performed through a normal operation of the steering wheel as described above, the second steering device may have a maximum turning angle limited to, for example, a range of ±several degrees (±2 to ±5 degrees). Thus, unlike conventional steer-by-wire systems, the second steering device has a limited influence on a traveling direction of the vehicle 101 and secures safety even where the supplementary turning actuator 5 becomes unable to be operated properly due to, e.g., power supply failure. Since the second steering device 150 is intended to additionally perform turning by an angle equal to or less than ±several degrees and only requires a single supplementary turning actuator 5, the structure can be simplified in comparison with that of a conventional mechanism that adjusts both of a toe angle and a camber angle. In addition, since the turning angle is corrected by several degrees or less, it is possible to improve the responsiveness to an operation of the steering wheel without making a driver feel fear.

In this way, it is possible to control turning angles of the left and right wheels 9, 9 in accordance with a vehicle velocity V and a steering command angle $\delta_h$ by using the mechanism having a simple structure and secured safety and thereby to improve responsiveness of the vehicle 101 to an operation of the steering wheel by a driver or a steering command from the automatic drive device.

In the steering system 100 of the present invention, the following equation (14) using a two-wheel model may be used in a control, in which the steering angle $\delta_2$ for auxiliary turning is calculated by the supplementary turning control section 151 of the second steering device 150 and is used for turning.

[Math 1]

$$\frac{\delta_2}{\delta_h}(s) = \frac{1}{n}\left[-\left[\frac{\frac{2\zeta}{\omega_n}\left(\alpha_1 - \alpha_2 - \frac{1}{\zeta\omega_n}\alpha_2 s\right)s}{1 + \frac{2\zeta}{\omega_n}s + \frac{1}{\omega_n^2}s^2}\right] + \left[\frac{\left(\frac{l_r}{V_{\beta=0}}\alpha_3 + \frac{l_r}{V}(1-\alpha_3)\right)s}{1 + \frac{l_r}{V}s + \frac{I}{2lK_r}s^2}\right]\right] \quad (14)$$

In the equation,
$\delta_2$: steering angle for auxiliary turning calculated as difference
$\delta_h$: steering command angle
V: vehicle velocity
$V_{\beta=0}$: vehicle velocity when skid angle $\beta$ relative to steering angle is zero
n: ratio (gear ratio) between steering command angle and steering angle of front wheel
$\zeta$: damping ratio
$\omega_n$: natural frequency (natural frequency of vehicle)
$\alpha_1, \alpha_2, \alpha_3$: parameter
$k_r$: tire cornering power per one rear wheel
$l_r$: distance between center of gravity of vehicle and rear wheel axle
l: distance between front wheel axle and rear wheel axle $(l_f+l_r)$
I: yaw moment of inertia of vehicle
s: complex variable in the Laplace transform As will be detailed in the detailed description of the invention, use of equation (14) makes it possible to suitably calculate a steering angle $\delta_2$ for auxiliary turning, i.e., a steering angle $\delta$ to be auxiliarily added, which is a difference between an ideal steering angle $\delta$ of a front wheel, determined by the numerical model of vehicle motion on the basis of the information on a steering command angle $\delta_h$ and a vehicle velocity V, and an actual steering angle $\delta_1$ of the wheels 9, 9 steered by the first steering device 11. This makes it possible to sufficiently improve responsiveness of the vehicle to an operation of the steering wheel by a driver.

In the steering system 100 of the present invention, the following equation (27) may be used in a control in which the steering angle $\delta_r$ for auxiliary turning is calculated by the supplementary turning control section 151 of the second steering device 150 and is used for turning.

[Math 2]

$$\delta_{hb} = \left[\frac{1}{2}(k_1 - k_2) + \alpha(k_1 + k_2)\frac{lh}{l_r d}a_y\right]\delta \quad (27)$$

In the equation,
$\delta$: steering angle of front wheel
$\delta_{hb}$: hub steering angle (right)
$-\delta_{hb}$: hub steering angle (left)
d: tread
l: distance between front wheel axle and rear wheel axle $(l_f+l_r)$
h: height of center of gravity from the ground
$\alpha$: front-axle lateral load transfer rate (parameter)

Use of equation (27) makes it possible to calculate a steering angle $\delta_{hb}$ for auxiliary turning and control each of the left and right second steering devices 150 by a small angle so as to effectively take advantage of operation stability performance of the wheels.

In the steering system 100 of the present invention, the supplementary turning control section 151 may be configured to control each supplementary turning actuator 5, 5 so as to perform turning by individual steering angles ($\delta_{2L}, \delta_{2R}$) for auxiliary turning, each of the individual steering angles being a difference between a steering angle $\delta$ of each of the left and right front wheels determined by the numerical model of vehicle motion and an actual steering angle $\delta_1$ of each of the left and right front wheels steered by the first steering device 11. In this case, for example, fine control can be made in such a way that traveling characteristics of the vehicle are changed by slightly changing the steering angles of the left and right wheels while the vehicle turns so as to change loads applied to the respective wheels 9, 9. Thus, vehicle motion performance can further be improved.

In the steering system 100 of the present invention, the second steering device 150 may include a hub unit main body 2 having a wheel-mount hub bearing 15 and a unit support member 3 configured to be connected to each of the chassis frame components 6 or be formed as a part of each of the chassis frame components 6, and the hub unit main body 2 may be a supplementary turning function-equipped hub unit that is supported by the unit support member 3 through a rotation-permitting support component 4 so as to be rotatable about a supplementary turning axis A extending in a vertical direction and is configured to be caused to rotate about the supplementary turning axis A by driving the supplementary turning actuator 5.

The second steering device 150 having the above feature makes it possible to arbitrarily adjust toe angles of the wheels 9, 9 attached to the hub unit main body 2 with simple configuration, without changing an existing basic vehicle structure.

In the steering system 100 of the present invention, the second steering device 150 may include:

a mechanism section 150a including a hub unit main body 2 having a wheel-mount hub bearing 15, and a unit support member 3 configured to be connected to each of the chassis frame components 6 or be formed as a part of each of the chassis frame components 6 and support the hub unit main body 2 such that an angle of the hub unit main body 2 can be changed relative to each of the chassis frame components 6; and a control device section 150b including the supplementary turning control section 151 and a motor control device 170, 175 configured to output a drive current in accordance with a motor command signal outputted by the supplementary turning control section 151 to drive the supplementary turning actuator 5.

The second steering device 150 having the mechanism section 150a and the control device section 150b as described above makes it possible to independently control the angles of the left and right wheels in accordance with a vehicle velocity V and a steering command angle $\delta_h$ by using the mechanical mechanism having a simple structure and secured safety and thereby to improve responsiveness of the vehicle to an operation of the steering wheel by a driver.

In the steering system 100 of the present invention, the supplementary turning actuator 5 of the second steering device 150 may include a reverse input prevention mechanism 25b.

Provision of the reverse input prevention mechanism 25b makes it possible to, in case where an abnormality occurs in a control system, prevent a reverse input from a road surface to suppress unsteadiness of the hub unit, only by immediately stopping the control of the supplementary turning actuator 5, as well as to move the vehicle by an operation of the steering wheel by a driver to a place where it can be parked assuredly. Thus, safety is secured. The reverse input prevention mechanism 25b may be easily provided by, for example, using a trapezoid screw in a mechanism for transmitting a motion of the supplementary turning actuator 5.

A vehicle of the present invention includes a steering system 100 according to any one of the above features of the present invention.

According to the vehicle having such a feature, the steering system 100 includes a mechanical mechanism having a simple structure and secured safety and thus makes it possible to control turning angles of the left and right front wheels in accordance with a vehicle velocity V and a steering command angle $\delta_h$ and thereby to improve responsiveness of the vehicle 101 to an operation of the steering wheel by a driver and/or a steering command from the automatic drive device.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures, FIG. 1 schematically illustrates conceptual features of a steering system according to an embodiment of the present invention and a vehicle equipped with the same;

DESCRIPTION OF THE EMBODIMENTS

An embodiment of the present invention will be described with reference to FIG. 1 to FIG. 16.

Figure 1:
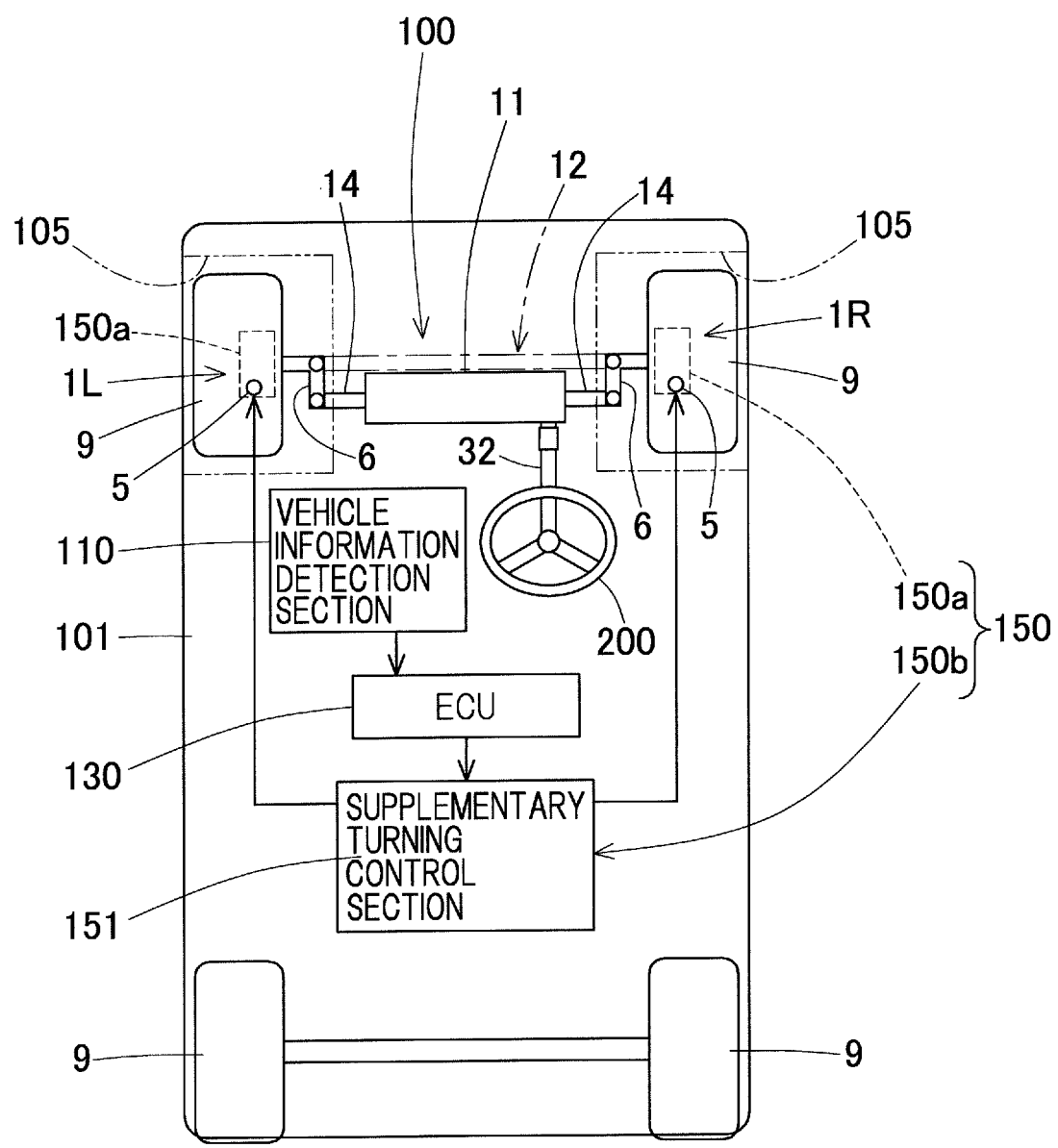

FIG. 1 schematically shows conceptual features of a vehicle 101 (e.g., automobile) equipped with a steering system 100 according to this embodiment. The vehicle 101 may be a four-wheel vehicle including right and left front wheels 9, 9 and right and left rear wheels 9, 9. The vehicle may be any of front-wheel drive, rear-wheel drive, and four-wheel drive.

The steering system 100 is a system for steering the vehicle 101 and includes a first steering device 11, a second steering device 150, and a vehicle information detection section 110.

Features of First Steering Device 11

The first steering device 11 is a device configured to be mechanically associated with a steering wheel 200 and to change an angle of left and right chassis frame components 6, 6 to which the left and right wheels 9, 9 are mounted so as to steer the right and left wheels 9, 9 that serve as front wheels in accordance with a steering command angle that corresponds to a steering-wheel angle. The chassis frame components 6, 6 correspond to knuckles in this embodiment.

The first steering device 11 includes well-known mechanical features, such as a steering shaft 32 to which the steering wheel 200 is attached, a rack and pinion (not illustrated), and tie rods 14. When a driver performs a rotational input to the steering wheel 200, the steering shaft 32 rotates in association therewith. As the steering shaft 32 rotates, the tie rods 14 connected to the steering shaft 32, through the rack and pinion, move in a widthwise direction of the vehicle so that the wheels 9 mounted to the chassis frame components 6 change their orientation along with the chassis frame components 6 of a suspension device 12. Thus, the left and right wheels 9, 9 can be steered in association with each other.

Schematic Features of Second Steering Device 150

The second steering device 150 is a device for performing auxiliary turning by a control in accordance with a state of the vehicle 101 and includes a mechanism section 150a that is a mechanical structure part and a control device section 150b for controlling the mechanism section 150a.

Figure 7:
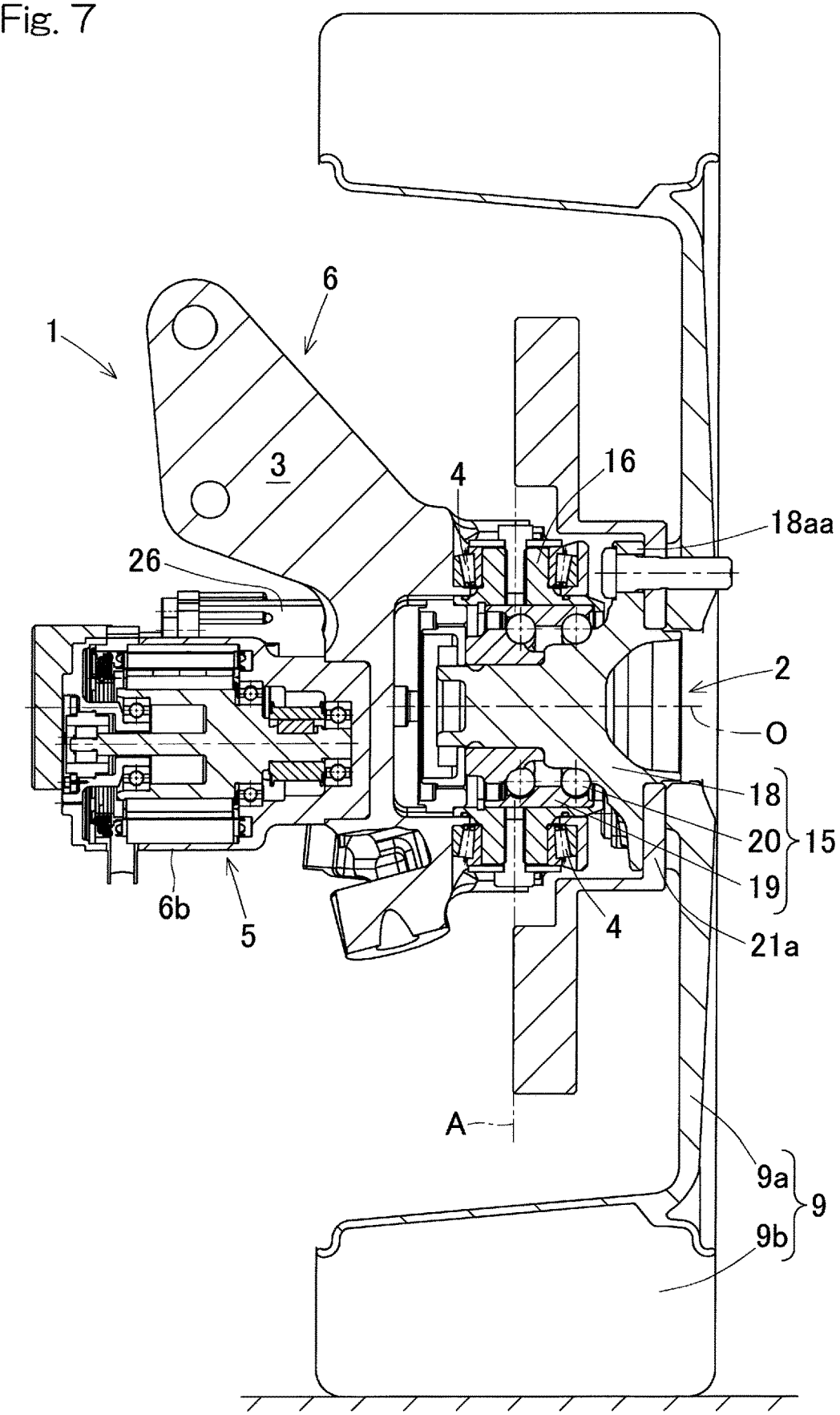
FIG. 7 is a longitudinal sectional view of a mechanism section of a second steering device of the steering system and surrounding features.

The mechanism section 150a is a mechanism provided to each of the wheels 9, 9 to be subjected to supplementary turning and is provided inside a tire housing 105 of the vehicle 101 so as to individually turn each wheel 9 with respect to the chassis frame component 6 by driving the supplementary turning actuators 5. As shown in FIG. 1 and FIG. 7, the mechanism section 150a is configured as a supplementary turning function-equipped hub unit including a hub unit main body 2 having a hub bearing 15, and a unit support member 3 connected to the chassis frame component 6 or formed as a part of the chassis frame component 6 to support the hub unit main body 2 such that an angle of the hub unit main body 2 can be changed with respect to the chassis frame component 6. The supplementary turning actuator 5 includes a reverse input prevention mechanism 25b (see FIG. 8) configured to prevent a reverse input of an external force from a road surface to the motor 26 that is a driving source thereof.

The second steering device 150 is configured as a supplementary turning function-equipped hub unit as described above and has a supplementary turning axis A in the hub unit, which is different from a rotation axis of the wheel 9. The supplementary turning actuator 5 in the hub unit is configured to perform turning about the supplementary turning axis A. The left and right wheels 9, 9 can be independently turned.

Details of the mechanism section 150a will be described later with reference to FIG. 7 to FIG. 14.

In FIG. 1, the control device section 150b includes a supplementary turning control section 151 configured to control the supplementary turning actuator 5 on the basis of vehicle information indicating a state of the vehicle 101 detected by the vehicle information detection section 110.

Vehicle Information Detection Section 110

The vehicle information detection section 110 detects the state of the vehicle 101 and refers to a group of various sensors. The vehicle information detected by the vehicle information detection section 110 is sent to the supplementary turning control section 151 of the second steering device 150 via a main ECU 130.

Figure 2:
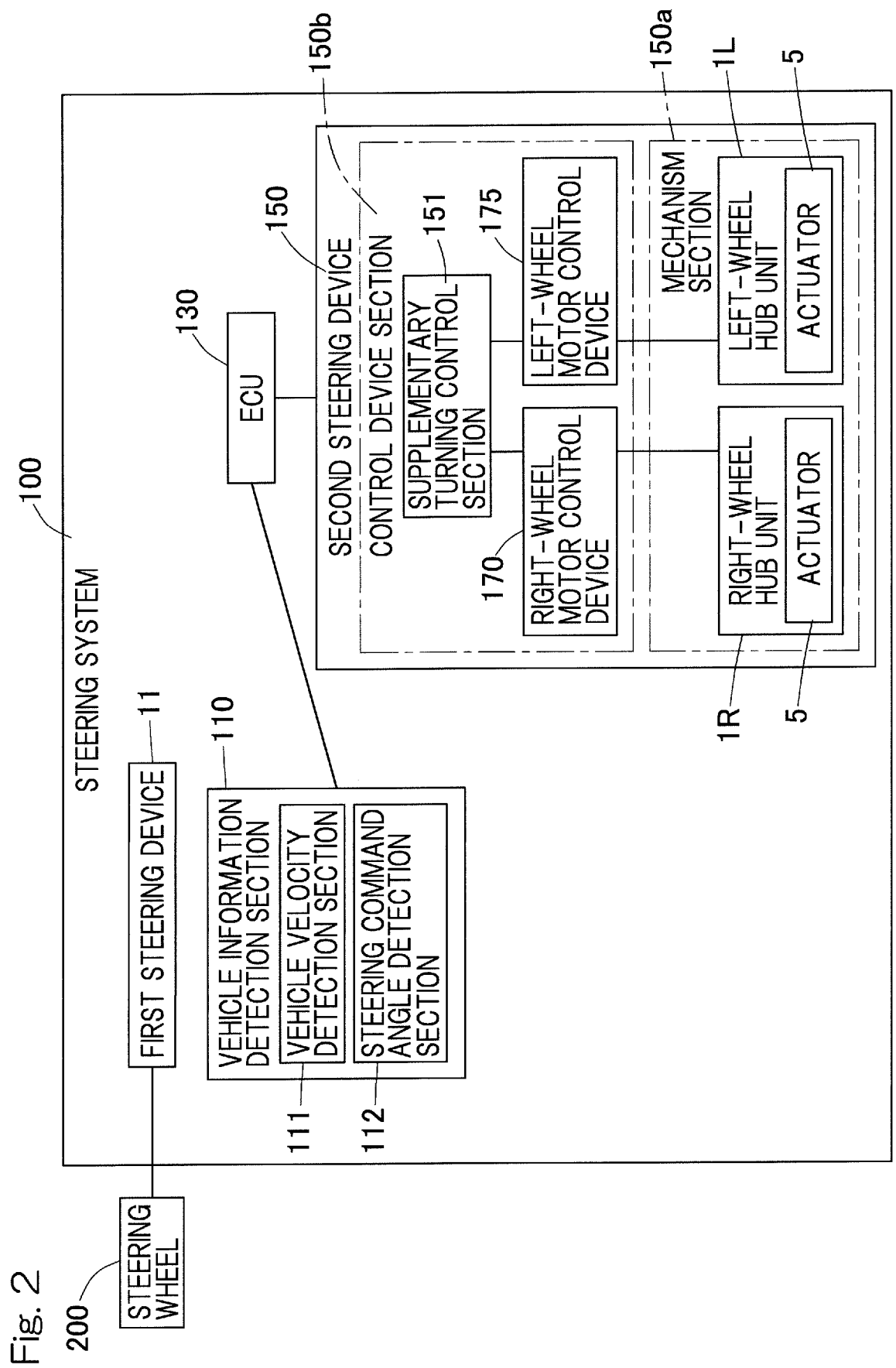
FIG. 2 is a block diagram illustrating conceptual features of the steering system.

As shown in FIG. 2, in this embodiment, the vehicle information detection section 110 includes a vehicle velocity detection section 111 configured to detect a vehicle velocity that is a traveling velocity of the vehicle 101 (FIG. 1) and a steering command angle detection section 112 configured to detect a steering command angle that is a rotation angle of the steering wheel 200.

The vehicle velocity detection section 111 is configured to detect a vehicle velocity of the vehicle on the basis of, e.g., an output from a sensor (not illustrated) such as a speed sensor attached inside a transmission of the vehicle and to output the vehicle velocity to the ECU 130.

The steering command angle detection section 112 is configured to detect a steering angle on the basis of, e.g., an output from a sensor (not illustrated) such as a resolver attached to a motor part of the first steering device 11 and to output the steering angle to the ECU 130.

ECU 130

The ECU 130 is a control unit for performing a coordinated control or an integrated control of the entire vehicle 101 (FIG. 1) and may also be referred to as a VCU. Although the supplementary turning control section 151 is provided as a dedicated ECU separate from the ECU 130 in this example, it may be provided as a part of the ECU 130.

Control Device Section 150b

As shown in FIG. 2, the control device section 150b includes: the supplementary turning control section 151; and right-wheel and left-wheel motor control devices 170, 175 each configured to output a drive current in accordance with a motor command signal outputted from the supplementary turning control section 151 to drive each of the respective supplementary turning actuators 5, 5 of the hub units 1R, 1L of the right and left wheels.

Supplementary Turning Control Section 151

Figure 3A:
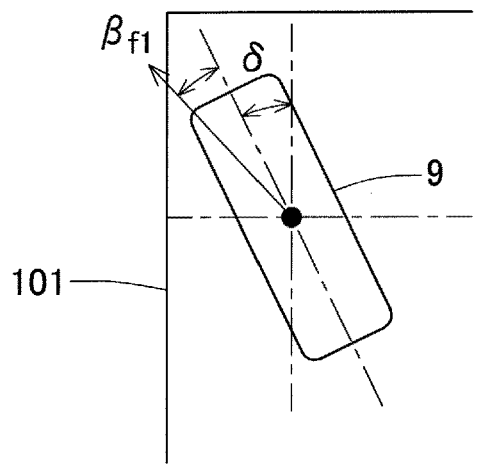
FIG. 3A is illustrates an assumption for conceptual features of a supplementary turning control section of the steering system.
Figure 3B:
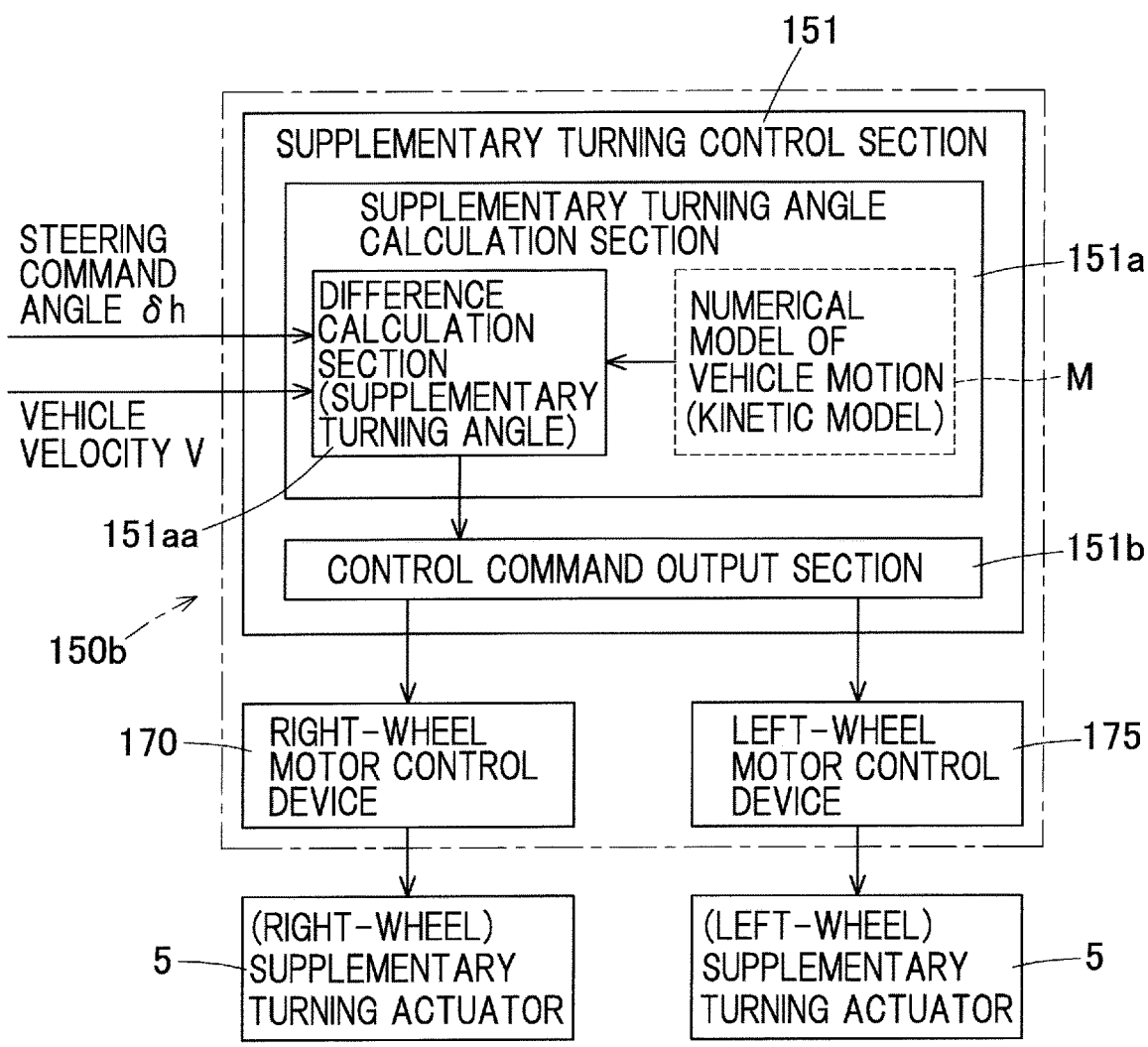
FIG. 3B is a block diagram illustrating the conceptual features of the supplementary turning control section of the steering system.

As shown in FIG. 3A and FIG. 3B, the supplementary turning control section 151 controls the supplementary turning actuators 5, 5 of the left and right wheels so as to perform turning by a steering angle $\delta_2$ for auxiliary turning that is a difference between a steering angle $\delta$ of the wheel, determined by a numerical model M of vehicle motion on the basis of the information on a steering command angle $\delta_h$ and a vehicle velocity V, and an actual steering angle $\delta_1$ of the wheels 9 steered by the first steering device 11 (FIG. 2).

The supplementary turning control section 151 includes: a supplementary turning angle calculation section 151a having a difference calculation section 151aa configured to calculate the steering angle $\delta_2$ for auxiliary turning that corresponds to the difference from the numerical model M of vehicle motion; and a control command output section 151*b* configured to output the steering angle $\delta_2$ calculated by the supplementary turning angle calculation section 151*a* as the motor command signal.

In the control based on the information of the steering command angle ho obtained using the numerical model M and the vehicle velocity V, the supplementary turning control section 151 uses equation (14) shown below in the control for improving responsiveness to steering and equation (27) in the control for effectively using the front wheels. Equation (14) and equation (27) are equations derived using the numerical model M. The supplementary turning control section 151 includes functions of equation (14) and equation (27), not the numerical model M itself.

[Math 3]

$$\frac{\delta_2}{\delta_h}(s) = \qquad (14)$$

$$\frac{1}{n}\left[1 - \left[\frac{\frac{2\zeta}{\omega_n}\left(\alpha_1 - \alpha_2 - \frac{1}{\zeta\omega_n}\alpha_2 s\right)s}{1 + \frac{2\zeta}{\omega_n}s + \frac{1}{\omega_n^2}s^2}\right] + \left[\frac{\left(\frac{l_r}{V_{\beta=0}}\alpha_3 + \frac{l_r}{V}(1-\alpha_3)\right)s}{1 + \frac{l_r}{V}s + \frac{l}{2lK_r}s^2}\right]\right]$$

The components in equation (14) are defined as below.

$\delta_2$: steering angle for auxiliary turning calculated as difference $\delta_h$: steering command angle V: vehicle velocity $V_{\beta=0}$: vehicle velocity when skid angle $\beta$ relative to steering angle is zero n: ratio between steering command angle and steering angle of front wheel $\zeta$: damping ratio $\omega_n$: natural frequency (natural frequency of vehicle)

$\alpha_1, \alpha_2, \alpha_3$: parameter $k_r$: tire cornering power per one rear wheel $l_r$: distance between center of gravity of vehicle and rear wheel axle l: distance between front wheel axle and rear wheel axle ($l_f + l_r$)

I: yaw moment of inertia of vehicle s: complex variable in the Laplace transform Control for Improving Responsiveness to Steering The supplementary turning actuator 5 is controlled so as to perform turning by the steering angle $\delta_2$ that is the difference calculated by equation (14). This makes it possible to control the angles of the left and right wheels in accordance with the vehicle velocity V and the steering command angle $\delta_h$ by using the mechanical mechanism having a simple structure and secured safety and thereby to improve responsiveness of the vehicle to an operation of the steering wheel by a driver.

The following describes how to obtain equation (14) and why the responsiveness can be improved by use of equation (14).

Figure 4:
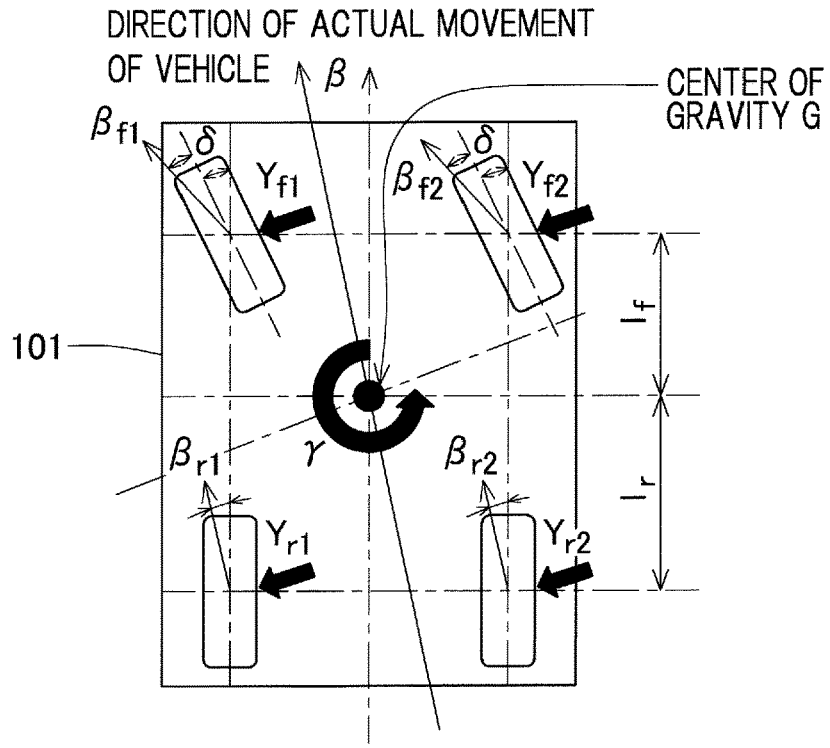
FIG. 4 illustrates a four-wheel model for the vehicle.

Referring to the four-wheel model shown in FIG. 4, lateral motion in a coordinate system fixed to the vehicle and having an origin at the center of gravity G of the vehicle 101 can be expressed by equation (1). Since cornering forces $Y_{f1}$, $Y_{f2}$, $Y_{r1}$, $Y_{r2}$ act as yawing moments about the center of gravity G, yawing motion about a vertical axis passing through the center of gravity G of the vehicle 101 can be expressed by equation (2).

Equations (1) and (2) provide one example of the numerical model of vehicle motion mentioned in the claims.

[Math 4]

$$mV\left(\frac{d\beta}{dt} + r\right) = Y_{f1} + Y_{f2} + Y_{r1} + Y_{r2} \qquad (1)$$

$$I\frac{dr}{dt} = l_f(Y_{f1} + Y_{f2}) - l_r(y_{r1} + Y_{r2}) \qquad (2)$$

The components in the equations are defined as below.

m: inertial mass of vehicle

Figure 5:
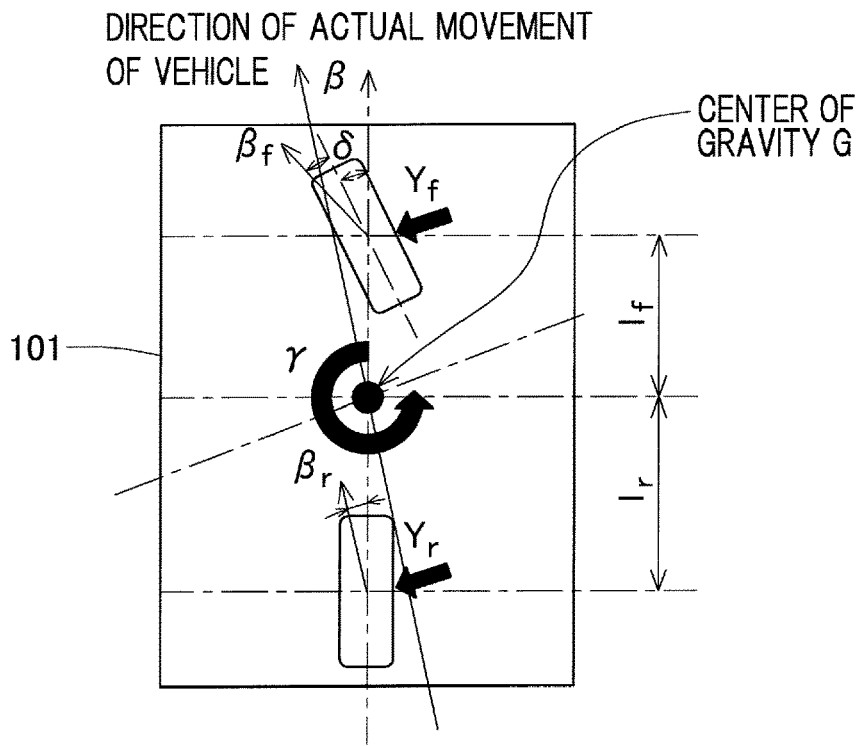
FIG. 5 illustrates a two-wheel model converted from the four-wheel model.

V: vehicle velocity $Y_{f1}, Y_{f2}, Y_{r1}, Y_{r2}$: cornering force of respective wheels $\delta$: steering angle of front wheel r: yaw rate or yaw angular velocity of vehicle $\beta$: skid angle of center of gravity of vehicle $\beta_{f1}, \beta_{f2}, \beta_{r1}, \beta_{r2}$: skid angle of respective wheels I: yaw moment of inertia of vehicle $l_f$: distance between center of gravity of vehicle and front wheel axle $l_r$: distance between center of gravity of vehicle and rear wheel axle In the following, the longitudinal two-wheel model shown in FIG. 5 will be used for simplicity of calculation. The cornering forces and the skid angles $\beta$ ($\beta_{f1}, \beta_{f2}, \beta_{r1}, \beta_{r2}$) of the left and right wheels 9, 9 are converted by equations (3) and (4) to those of the two-wheel model.

[Math 5]

$$Y_f = Y_{f1} + Y_{f2}, \, Y_r = Y_{r1} + Y_{r2} \qquad (3)$$

$$\beta_f = \beta_{f1} = \beta_{f2} = \beta + \frac{l_f r}{V} - \delta, \, \beta_r = \beta_{r1} = \beta_{r2} = \beta - \frac{l_r r}{V} \qquad (4)$$

Taking equations (3) and (4) into consideration, equations (1) and (2) are rewritten as equations (5) and (6), respectively.

Equations (5) and (6) provide another example of the numerical model of vehicle motion mentioned in the claims. Where the two-wheel model is used, the steering angles $\delta$ determined from the numerical model are the same for the left and right wheels 9, 9, and the steering angles $\delta_2$ for auxiliary turning are also the same for the left and right wheels.

[Math 6]

$$mV\left(\frac{d\beta}{dt} + r\right) = 2Y_f + 2Y_r \qquad (5)$$

$$I\frac{dr}{dt} = 2l_f Y_f + 2l_r Y_r \qquad (6)$$

Equation (7) and equation (8) below are obtained from equations (5) and (6) by use of $\beta(s)$, r(s), $\delta(s)$, $\delta_h(s)$ as the Laplace transforms of a skid angle $\beta$ of the center of gravity of the vehicle, a yaw rate r, a steering angle $\delta$ of the front wheels, and a steering command angle $\delta_h$, respectively. As used herein, $K_f$, $k_r$ denote tire cornering power per one front wheel and one single rear wheel, respectively.

[Math 7]

$$\{mVs + 2(K_f + K_r)\}\beta(s) + \left\{mV + \frac{2}{V}(l_f K_f - l_r K_r)\right\}r(s) = 2K_f \delta(s) \quad (7)$$

$$2(l_f K_f - l_r K_r)\beta(s) + \left\{Is + \frac{2(l_f^2 K_f + l_r^2 K_r)}{V}\right\}r(s) = 2l_f K_f \delta(s) \quad (8)$$

When equations (7) and equation (8) are solved for $\beta(s)$ and $r(s)$, equations (9) and (10) are obtained. As used herein, $\omega_n$ denotes a natural frequency of a response of the vehicle to steering, and $\zeta$ denotes a damping ratio of a response of the vehicle to steering. $G_\delta^\beta(0)$ denotes a skid angle gain constant and indicates a value of a skid angle $\beta$ relative to a steering angle $\delta$ of the front wheels. $G_\delta^r(0)$ denotes a yaw rate gain constant and indicates a value of an yaw rate r relative to a steering angle $\delta$ of the front wheels.

[Math 8]

$$\beta(s) = G_\delta^\beta(0) \frac{1 + T_\beta s}{1 + \frac{2\zeta s}{\omega_n} + \frac{s^2}{\omega_n^2}} \frac{\delta}{\delta_h}(s)\delta_h(s) \quad (9)$$

$$r(s) = G_\delta^r(0) \frac{1 + T_r s}{1 + \frac{2\zeta s}{\omega_n} + \frac{s^2}{\omega_n^2}} \frac{\delta}{\delta_h}(s)\delta_h(s) \quad (10)$$

Assuming that $\beta$ has a small value, a lateral acceleration $\ddot{y}$ can be expressed by equation (11).

[Math 9]

$$\ddot{y} = V\cos\beta\left(\frac{d\beta}{dt} + r\right) = V\left(\frac{d\beta}{dt} + r\right) \quad (11)$$

By applying the Laplace transformation to equation (11) and substituting equations (9) and (10) into the transformed equation (11), equation (12) is obtained. $G_\delta^{\ddot{y}}(0)$ denotes a lateral acceleration gain constant and indicates a value of a lateral angular velocity $\ddot{y}$ relative to a steering angle $\delta$ of the front wheels.

[Math 10]

$$\ddot{y}(s) = G_\delta^{\ddot{y}}(0) \frac{1 + \frac{l_r}{V}s + \frac{I}{2lK_r}s^2}{2 + \frac{2\zeta s}{\omega_n} + \frac{s^2}{\omega_n^2}} \frac{\delta}{\delta_h}(s)\delta_h(s) \quad (12)$$

From equations (9), (10) and (12), a control rule for the steering angle of the front wheels for improving responsiveness to steering is expressed by equation (13). As used herein, the parameters of $\alpha_1$, $\alpha_2$, $\alpha_3$ correspond to a damping ratio $\zeta$, a natural frequency $\omega$, and a lateral acceleration $\ddot{y}$, respectively. Assuming that $\alpha_1$, $\alpha_2$, $\alpha_3$ have small values, the equation (13) below is derived. By suitably changing the respective parameters of $\alpha_1$, $\alpha_2$, $\alpha_3$, it is possible to simultaneously improve responses of a skid angle $\beta$, a yaw rate r, and a lateral acceleration $\ddot{y}$.

[Math 11]

$$\frac{\delta}{\delta_h}(s) = \quad (13)$$

$$\frac{1}{n}\left[\left[\frac{1 + \frac{2\zeta}{\omega_n}s + \frac{1}{\omega_n^2}s^2}{1 + \frac{2\zeta(1+\alpha_1)}{\omega_n(1+\alpha_2)}s + \frac{1}{\omega_n^2(1+\alpha_2)}s^2}\right] \cdot \left[\frac{\left(\frac{l_r}{V_{\beta=0}}\alpha_3 + \frac{l_r}{V}(1-\alpha_3)\right)s}{1 + \frac{l_r}{V}s + \frac{l}{2lK_r}s^2}\right]\right]$$

$$\approx$$

$$\frac{1}{n}\left[1 - \left[\frac{\frac{2\zeta}{\omega_n}\left(\alpha_1 - \alpha_2 - \frac{1}{\zeta\omega_n}\alpha_2 s\right)s}{1 + \frac{2\zeta}{\omega_n}s + \frac{1}{\omega_n^2}s^2}\right] + \left[\frac{\left(\alpha_3\frac{l_r}{V_{\beta=0}} + (1-\alpha_3)\frac{l_r}{V}\right)s}{1 + \frac{l_r}{V}s + T_2 s^2}\right]\right]$$

From equation (13), a control rule for determining a steering angle $\delta_2$ for auxiliary turning to be performed using the second steering device 150 can be expressed by equation (14).

[Math 12]

$$\frac{\delta_2}{\delta_h}(s) = \quad (14)$$

$$\frac{1}{n}\left[-\left[\frac{\frac{2\zeta}{\omega_n}\left(\alpha_1 - \alpha_2 - \frac{1}{\zeta\omega_n}\alpha_2 s\right)s}{1 + \frac{2\zeta}{\omega_n}s + \frac{1}{\omega_n^2}s^2}\right] + \left[\frac{\left(\frac{l_r}{V_{\beta=0}}\alpha_3 + \frac{l_r}{V}(1-\alpha_3)\right)s}{1 + \frac{l_r}{V}s + \frac{l}{2lK_r}s^2}\right]\right]$$

Figure 6:
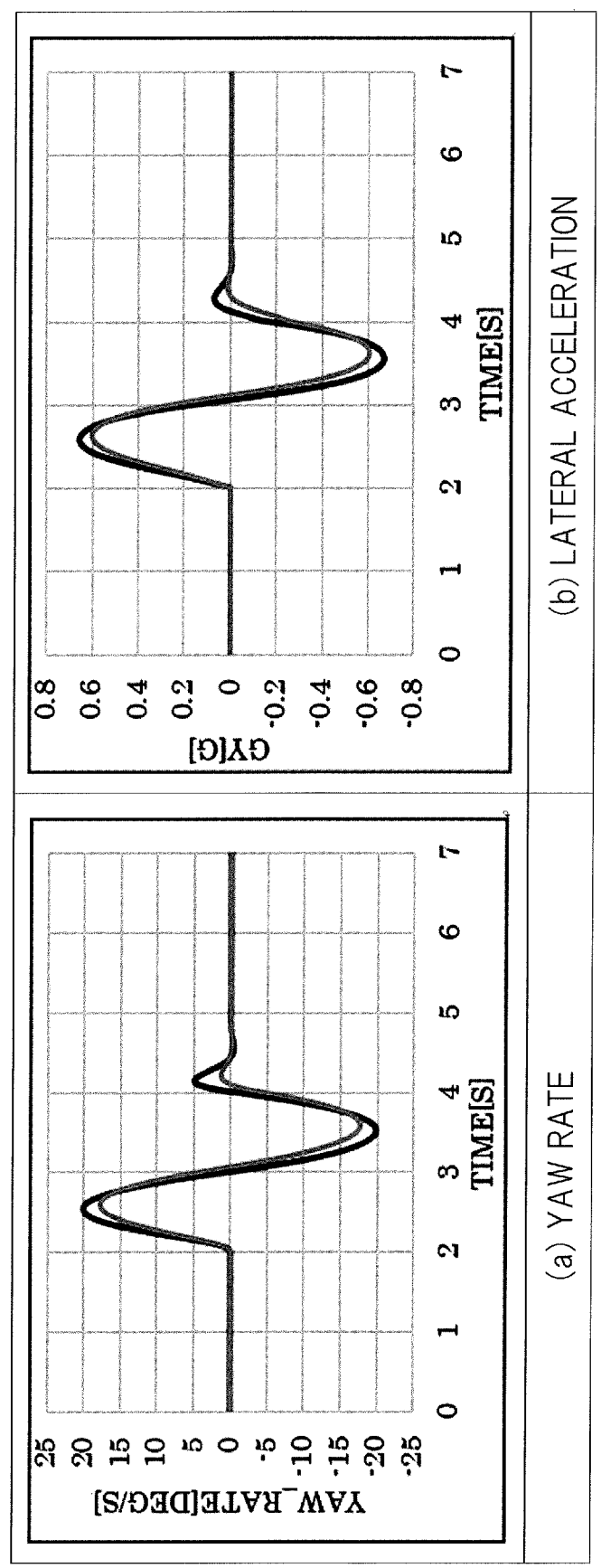
FIG. 6 shows graphs of changes in yaw rate and lateral acceleration of a vehicle with and without a supplementary turning control performed in the steering system.

Responsiveness to steering can be adjusted by changing the respective parameters of $\alpha_1$, $\alpha_2$, $\alpha_3$. FIG. 6 shows analytical results of the yaw rate r and the lateral acceleration $\ddot{y}$ when sinusoidal steering at 0.5 [Hz] is performed to change lanes by 2.5 [m]. In this example, the following setting is used: $\alpha_1 = -0.2$, $\alpha_2 = 0.2$, $\alpha_3 = 1$. The data represented by the black curve show results with control, and the data represented by the gray curve show results without control. It can be seen that the control allows the yaw rate and the lateral acceleration to rise faster and thus improves responsiveness to steering.

In this example, the left and right wheels 9, 9 have the same steering angle because the control equation using the two-wheel model is employed. Where a four-wheel model is employed, however, the left and right wheels 9, 9 generally have different values of the steering angle ($\delta_{2L}$, $\delta_{2R}$). In such a case, auxiliary turning of the left and right wheels may be performed using different values. Alternatively, a single common steering angle $\delta_2$ for auxiliary turning may be calculated from different values for the left and right wheels and be used to perform auxiliary turning of both of the left and right wheels 9, 9.

Further, the information on a steering-wheel angle and a traveling velocity may be used to independently operate the supplementary turning function-equipped hub units of the left and right wheels using the following equations so as to unitedly achieve Ackermann steering at extremely low speed as well as effective use of the tires in a tire load transfer region at middle/high speed.

Control for Effectively Using Front Wheels

[Math 13]

As used herein, the components in the following equation (15) to equation (29) are defined as below.

$\delta$: steering angle of front wheel
$\delta_{2L}$: left wheel angle
$\delta_{2R}$: right wheel angle
$\delta_{hb}$: hub steering angle n: ratio (gear ratio) of steering-wheel angle to steering angle of front wheel
β: skid angle of vehicle
r: yaw rate of vehicle
V: vehicle velocity
W: vehicle weight
ΔW: front-wheel lateral load transfer amount
d: tread
l: distance between a front wheel axle and a rear wheel axle ($l_f+l_r$)
h: height of a center of gravity from the ground
α: front-axle lateral load transfer rate (parameter)
s: complex variable in the Laplace transform

[Math 14]

The skid angles of the left and right front wheels of the vehicle are expressed by equations (15) and (16).

$$\beta_1 = \delta - \delta_{hb} - \frac{v_1}{u_1} = \delta - \delta_{hb} - \frac{V\beta + l_f r}{V - \frac{d}{2}r} = \delta - \delta_{hb} - \frac{\beta + l_f \frac{r}{V}}{1 - \frac{d}{2}\frac{r}{V}} \quad (15)$$

$$\beta_2 = \delta + \delta_{hb} - \frac{v_2}{u_2} = \delta + \delta_{hb} - \frac{V\beta + l_f r}{V + \frac{d}{2}r} = \delta + \delta_{hb} - \frac{\beta + l_f \frac{r}{V}}{1 + \frac{d}{2}\frac{r}{V}} \quad (16)$$

Approximation of steady motion of the vehicle by a response to an average of the left and right steering angle inputs 6 gives the skid angle of the vehicle and the yaw rate of the vehicle expressed by equations (17) and (18), respectively.

$$\beta = \frac{v}{V} = \frac{1 - BV^2}{1 + AV^2}\frac{l_r}{l}\delta \quad (17)$$

$$r = \frac{V}{1 + AV^2}\frac{\delta}{l} \quad (18)$$

[Math 15]

When equations (17) and (18) are substituted into equations (15) and (16), equations (19) and (20) are obtained.

$$\beta_1 = \left(1 - \frac{1 - B\frac{l_r}{l}V^2}{1 + AV^2 - \frac{d}{2l}\delta}\right)\delta - \delta_{hb} = k_1\delta - \delta_{hb} \quad (19)$$

$$\beta_2 = \left(1 - \frac{1 - B\frac{l_r}{l}V^2}{1 + AV^2 + \frac{d}{2l}\delta}\right)\delta + \delta_{hb} = k_2\delta + \delta_{hb} \quad (20)$$

where $$k_1 = \left(1 - \frac{1 - B\frac{l_r}{l}V^2}{1 + AV^2 - \frac{d}{2l}\delta}\right), k_2 = \left(1 - \frac{1 - B\frac{l_r}{l}V^2}{1 + AV^2 + \frac{d}{2l}\delta}\right) \quad (21)$$

$$A = -\frac{m}{2l^2}\frac{l_f K_f - l_r K_r}{K_f K_r}, B = -\frac{ml_f}{2ll_r K_r} \quad (22)$$

[Math 16]

Assuming that the skid angle of each wheel is proportional to a load acting on the tire, equation (23) is obtained.

Where there is an extremely small lateral acceleration to cause little lateral load transfer, $W_1$ is equal to $W_2$, and it is required that skids in a lateral direction have the same sign and the same value. Where a lateral acceleration increases and causes load transfer, the skid angle changes in proportion thereto. Thus, it is possible to satisfy the Ackermann steering condition at extremely low speed as well as to achieve skid angles in accordance with load transfer caused by an acceleration at middle/high speed.

$$\frac{\beta_2}{\beta_1} = \frac{k_1\delta + \delta_{hb}}{k_2\delta - \delta_{hb}} = \frac{W_2}{W_1} \rightarrow k_1 W_2 \delta - W_2 \delta_{hb} = k_2 W_1 \delta - W_1 \delta_{hb} \quad (23)$$

$$\therefore \delta_{hb} = \frac{k_1 W_2 - k_2 W_1}{W_1 + W_2}\delta$$

[Math 17]

Where α denotes a longitudinal load balance during turning, $$W_1 = \frac{l_r}{2l}W - \Delta W = \frac{l_r}{2l}W\left(1 - \alpha\frac{2lh}{l_r d}a_y\right) \quad (24)$$

$$W_2 = \frac{l_r}{2l}W + \Delta W = \frac{l_r}{2l}W\left(1 + \alpha\frac{2lh}{l_r d}a_y\right) \quad (25)$$

$$\Delta W = \alpha\frac{h}{d}Wa_y, a_y(s) = \frac{1}{gl}\frac{V^2}{1 + AV^2}\frac{1}{1 + T_D s}\frac{\delta_h(s)}{n} \quad (T_D = 0.1 \sim 0.2) \quad (26)$$

Therefore, a hub steering angle $\delta_{hb}$ is calculated by using values of $W_1$ and $W_2$ and expressed by equation (27).

$$\delta_{hb} = \left[\frac{1}{2}(k_1 - k_2) + \alpha(k_1 + k_2)\frac{lh}{l_r d}a_y\right]\delta \quad (27)$$

[Math 18]

When equation (21) is substituted into equation (27), $\delta_{hb}$ is expressed by equation (28).

$$\delta_{hb} = \frac{1}{2}(k_1 - k_2)\delta + \alpha(k_1 + k_2)\frac{lh}{l_r d}a_y\delta = \frac{-\left(1 - B\frac{l_r}{l}V^2\right)\frac{d}{2l}\delta}{(1 + AV^2)^2 - \left(\frac{d}{2l}\delta\right)^2}\delta + \quad (28)$$

$$\alpha\frac{\left(A + B\frac{l_r}{l}\right)V^2(1 + AV^2) - \left(\frac{d}{2l}\delta\right)^2}{(1 + AV^2)^2 - \left(\frac{d}{2l}\delta\right)^2}\frac{lh}{l_r d}a_y\delta$$

Where a vehicle velocity V is low, and a lateral acceleration $a_y$ is low ($V^2=0$, $a_y=0$), Ackermann steering is assumed.

$$\delta_{hb} \approx -\frac{d}{2l}\delta^2$$

Thus, the steering angles of the left and right wheels during the control may be expressed by equation (29).

$$\delta_{2L} = \frac{\delta_h}{n} - \delta_{hb} \text{ (left)} \tag{29}$$

$$\delta_{2R} = \frac{\delta_h}{n} + \delta_{hb} \text{ (right)}$$

By suitably changing parameter α, it is possible to satisfy the Ackermann steering condition at extremely low speed as well as to achieve skid angles in accordance with load transfer caused by an acceleration at middle/high speed.

Figure 15:
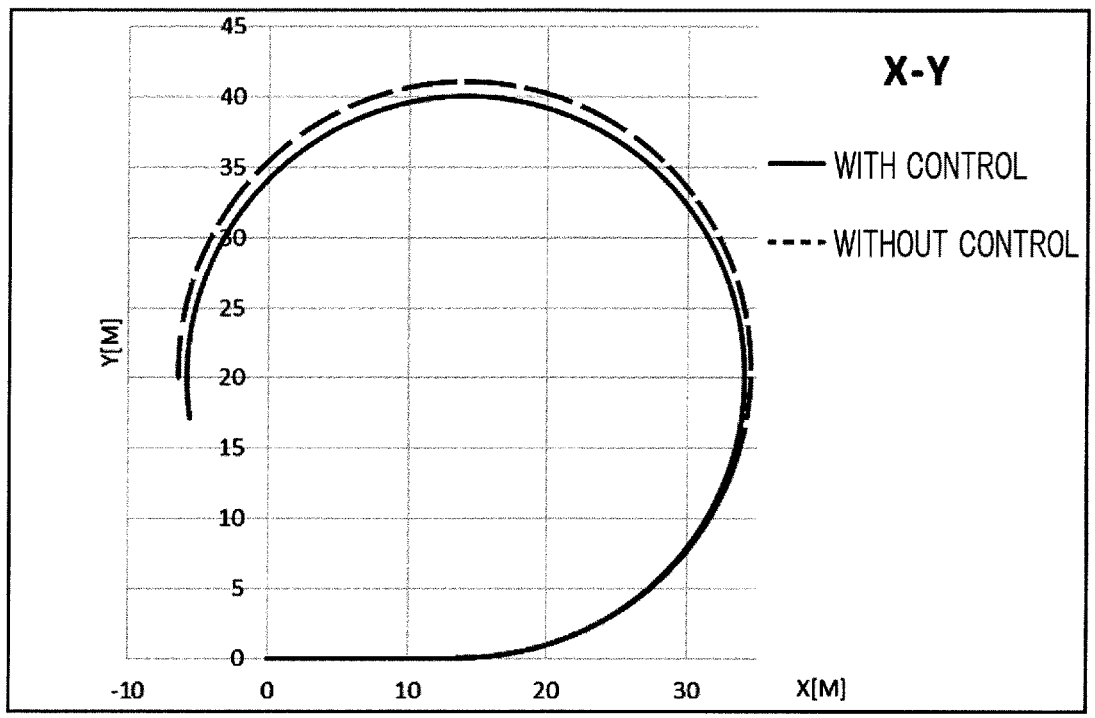
FIG. 15 shows analytical results of vehicle turning paths and lateral acceleration.
Figure 15:
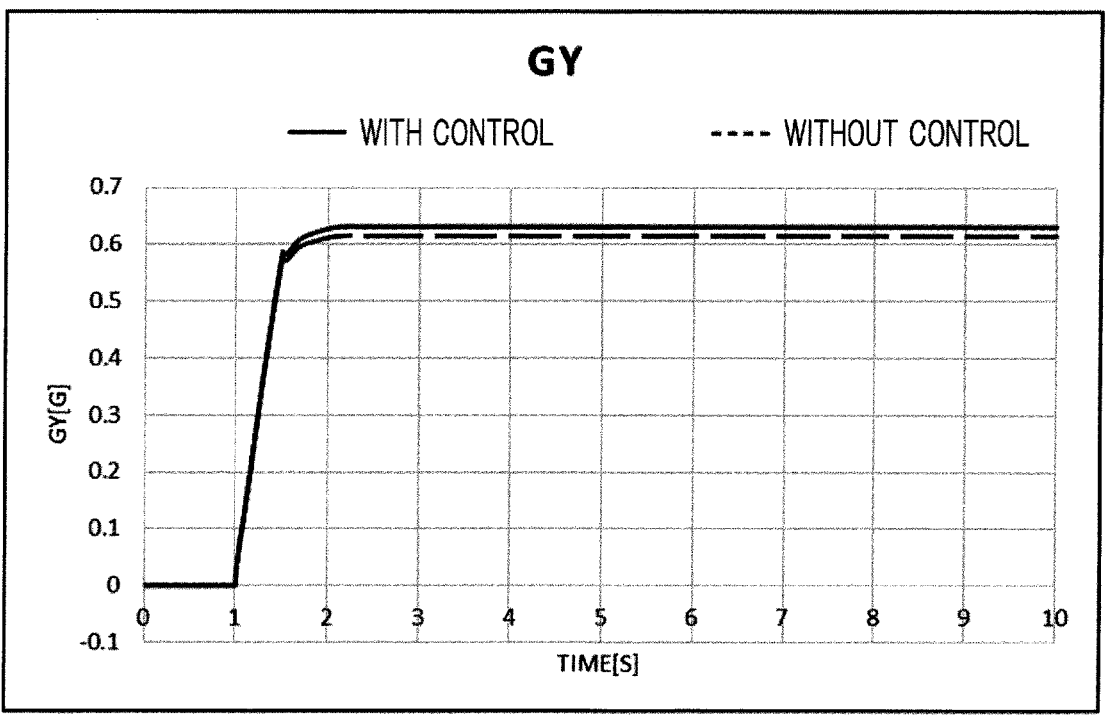
Figure 16:
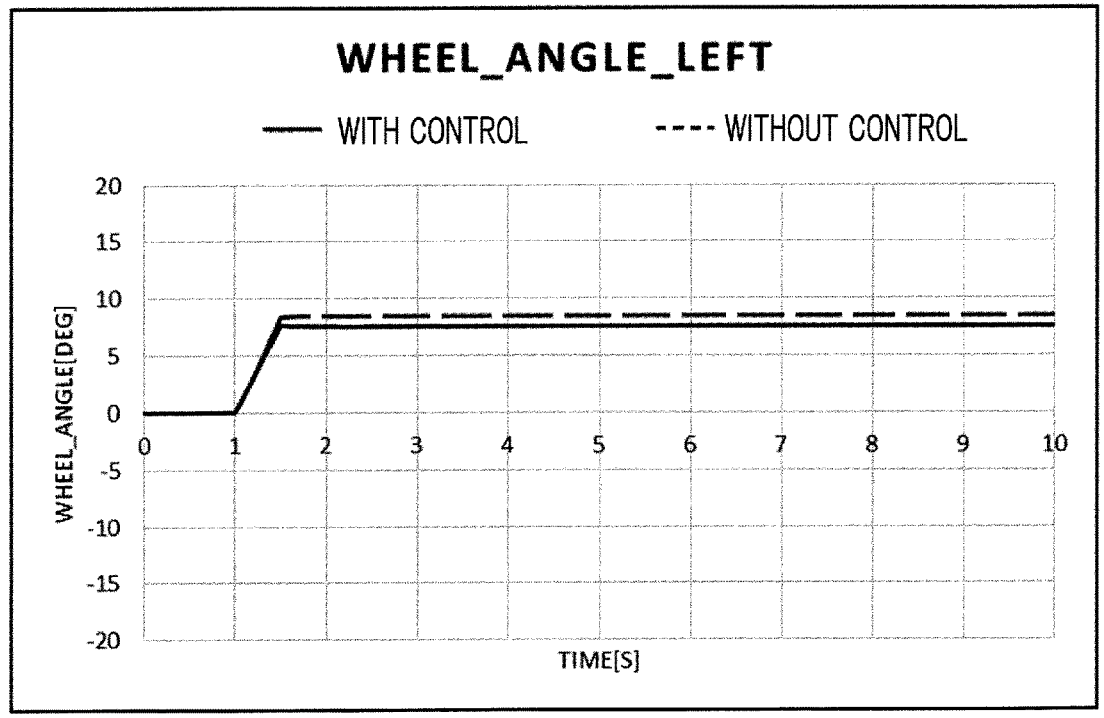
FIG. 16 shows analytical results of left wheel angles and right wheel angles.
Figure 16:
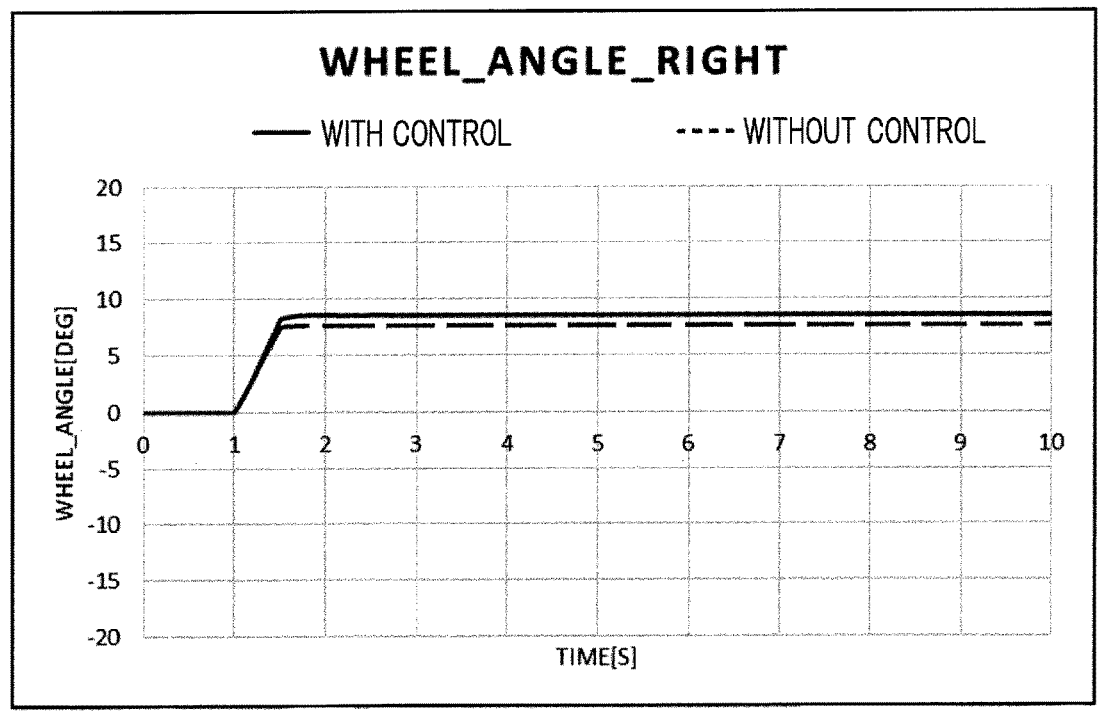

FIG. 15 and FIG. 16 show analytical results of turning paths and lateral accelerations where turning is performed at a vehicle velocity of 40 [km/h], with a ramp step input of 0.5 [s], by an angle of 120 [deg].

For the analytical results, the following setting is used: α=0.5. The data represented by the solid line show results with control, and the data represented by the dashed line shows results without control. It can be seen that the control causes an outer wheel, which receives an increased load during turning, to turn to a greater extent and an inner wheel, which receives a reduced load, to turn to a lesser extent so that a turning radius is made smaller by the control.

Effects and Advantages

The results of exemplary simulation for improving responsiveness to steering has been described above. A steering system having the above configuration provides the following effects.

By using the second steering devices 150 provided to the left and right wheels 9, 9 during driving to calculate a steering angle $\delta_2$ for auxiliary turning by equation (14) on the basis of the information on a vehicle velocity V and a steering command angle $\delta_h$ and to control the second steering devices 150 on the left and right sides with a small angle, it is possible to improve responsiveness of the vehicle to an operation of the steering wheel by a driver without making the driver feel fear.

Where control equations using a two-wheel model are employed, it is possible to improve responsiveness of the vehicle at low cost with the simple control equations, although the left and right wheels 9, 9 have the same steering angle. Where a four-wheel model is employed, fine control can be made, for example, in such a way that traveling characteristics of the vehicle are changed by slightly changing steering angles of the left and right wheels so as to change loads applied to the respective wheels 9, 9 (inner and outer wheels). Thus, vehicle motion performance can further be improved.

Additionally, by calculating a steering angle Su for auxiliary turning with equation (27) and by controlling the respective second steering devices 150 on the left and right sides with a small angle, it is possible to effectively take advantage of tire performance.

Figure 14:
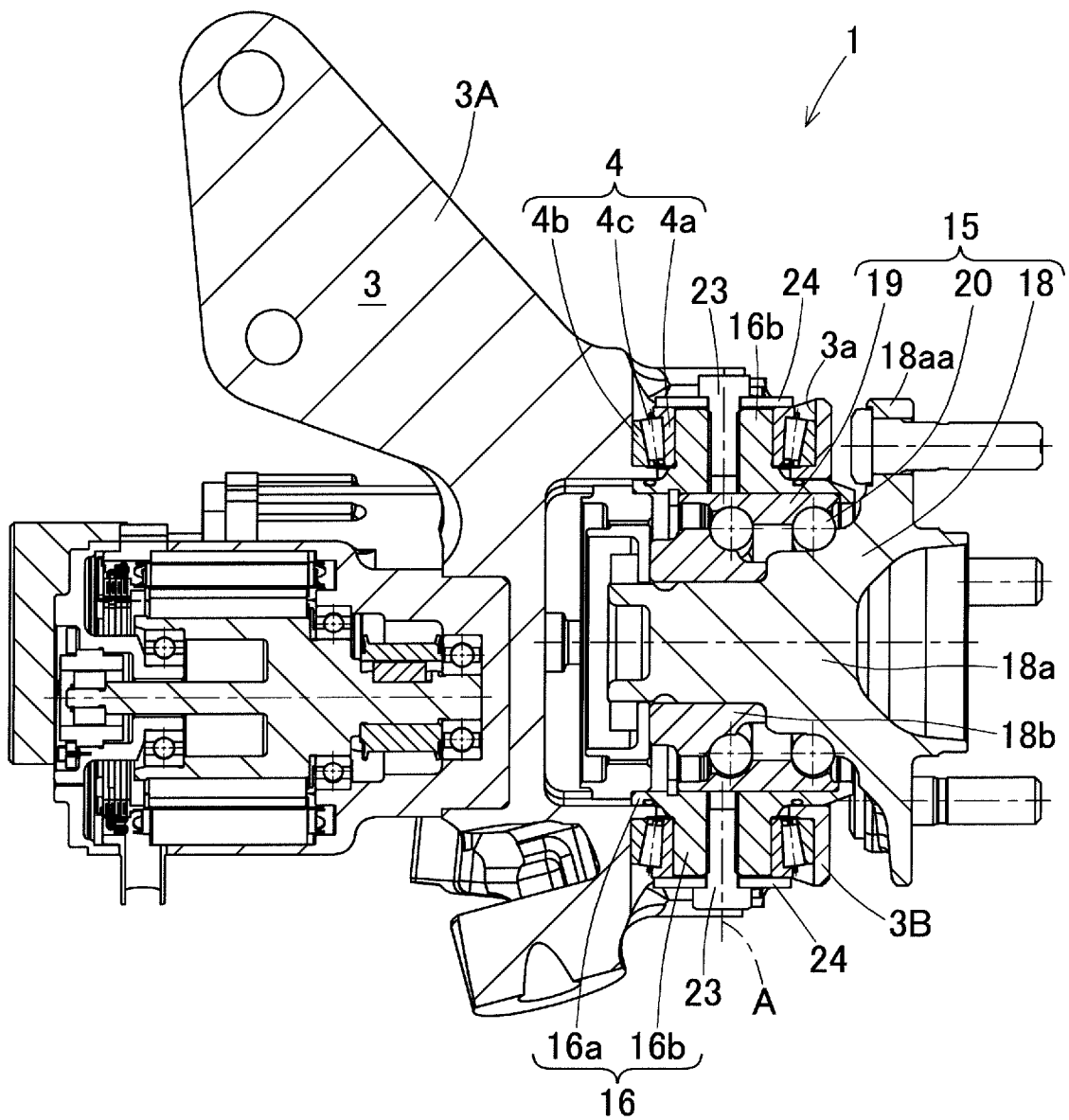
FIG. 14 is a cross-sectional view along line XIV-XIV in FIG. 12.

The supplementary turning function-equipped hub unit that serves as the second steering device 150 has the supplementary turning axis A in the hub unit, which is different from the rotation axis of the wheel 9. As shown in FIG. 14, a hub bearing part is rotatably held about the supplementary turning axis A by attachment shaft parts 16b, 16b provided above and below the outer ring 16. As shown in FIG. 7, the hub bearing part can be rotationally operated about the supplementary turning axis A by the supplementary turning actuator 5 disposed in the hub unit 1. This mechanism makes it possible to, with simple configuration, arbitrarily adjust a toe angle of each of the wheels 9, 9 attached to the hub units 1, without changing an existing basic structure of a vehicle.

Figure 8:
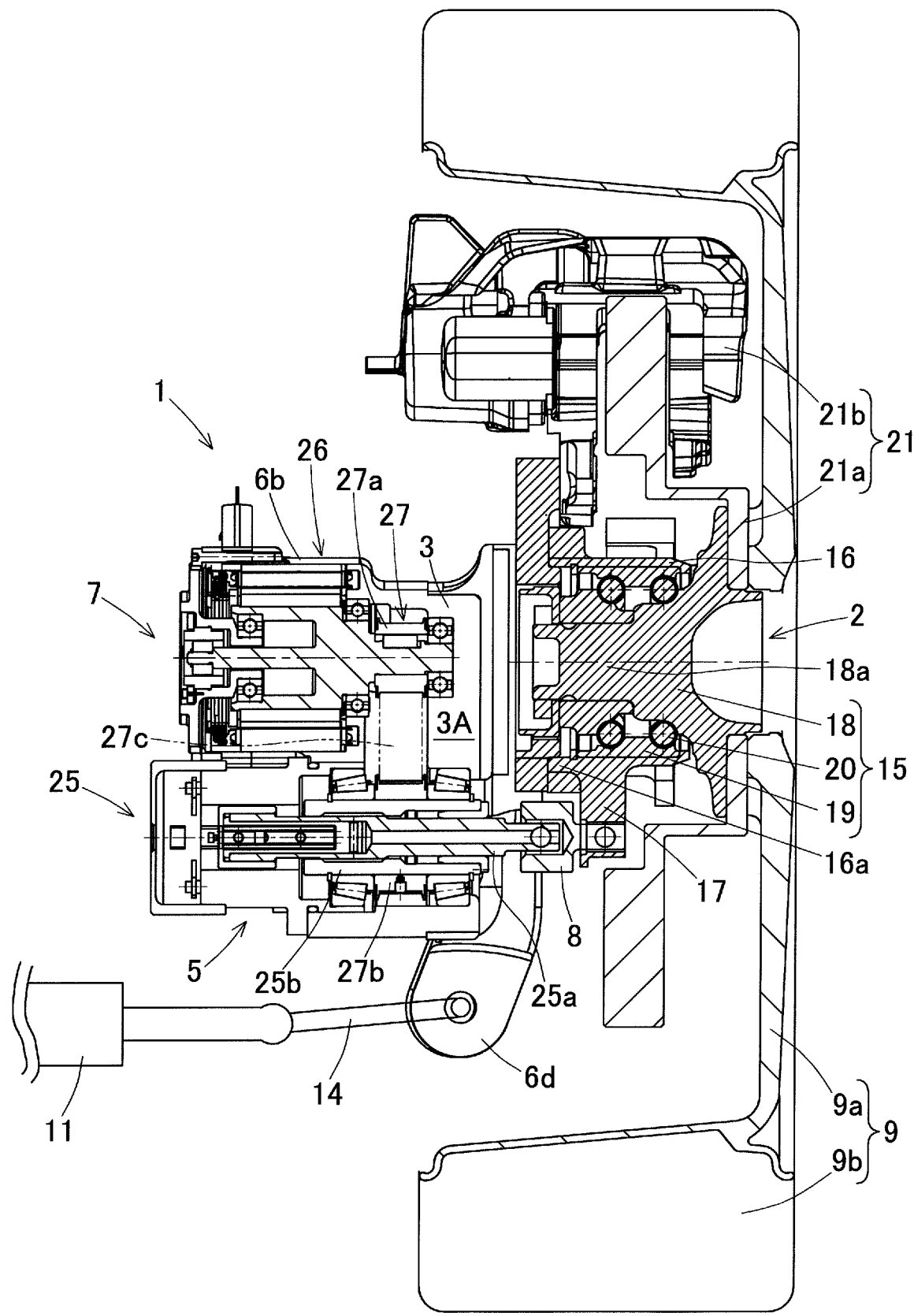
FIG. 8 is a horizontal sectional view illustrating features including the mechanism section of the second steering device.

As shown in FIG. 8, the supplementary turning actuator 5 has a reverse input prevention function 25b, and a maximum turning angle of the supplementary turning function-equipped hub unit 1 is limited to a range of ±several degrees which is required for correction operations. Thus, where a power source of one of the motor control devices 170, 175 in FIG. 3B fails, control of the other of the motor control devices 170, 175 is stopped so that a turning angle of the hub unit is fixed, and a driver can safely use the steering wheel to move the vehicle to a safe place such as a shoulder of a road. Therefore, it is possible to omit or simplify a mechanism for safety measure in case of system failure.

Example of Specific Configuration of Second Steering Device 150

Figure 9:
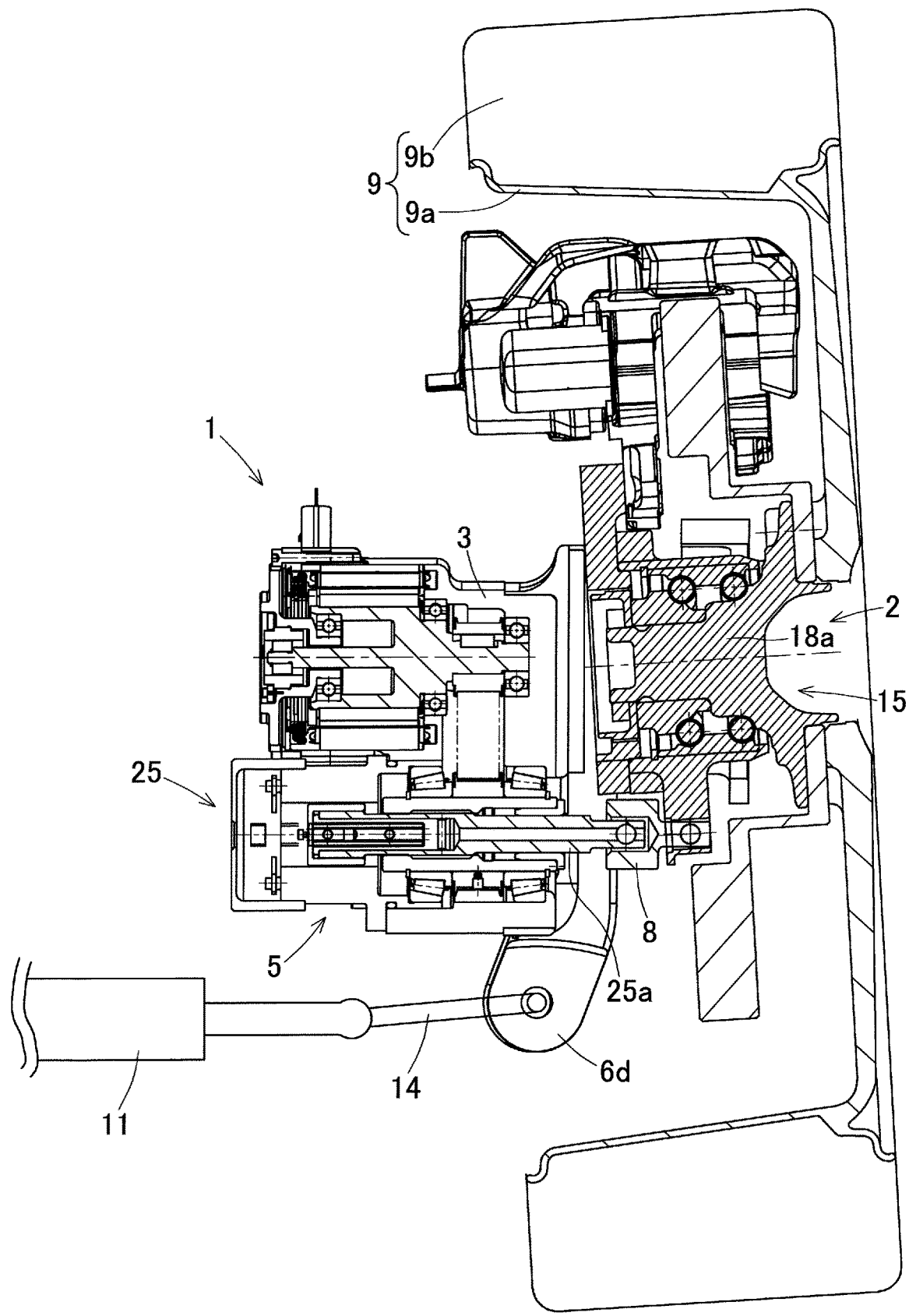
FIG. 9 is a horizontal sectional view illustrating a different operation state of the mechanism section and the like of the second steering device.

As shown in FIG. 1 and FIG. 9, the second steering device 150 can independently turn the left and right wheels 9, 9. The mechanism section 150a that serves as the supplementary turning function-equipped hub unit of the second steering device 150 includes a right-wheel hub unit 1R (FIG. 2) and a left-wheel hub unit 1L (FIG. 2). The right-wheel hub unit 1R and left-wheel hub unit 1L are configured to perform turning of the wheels 9, 9 by the supplementary turning actuators 5 (FIG. 7) disposed within the tire housings 105.

The mechanism section 150a that serves as the supplementary turning function-equipped hub unit of the second steering device 150 includes the right-wheel hub unit 1R and left-wheel hub unit 1L as described above, and each of the right-wheel hub unit 1R and left-wheel hub unit 1L is configured as the supplementary turning function-equipped hub unit 1 shown in FIG. 7.

As shown in FIG. 7, the hub unit 1 includes a hub unit main body 2, a unit support member 3, rotation-permitting support components 4, and a supplementary turning actuator 5. The unit support member 3 is integrally provided to a knuckle that is the chassis frame component 6.

Figure 11:
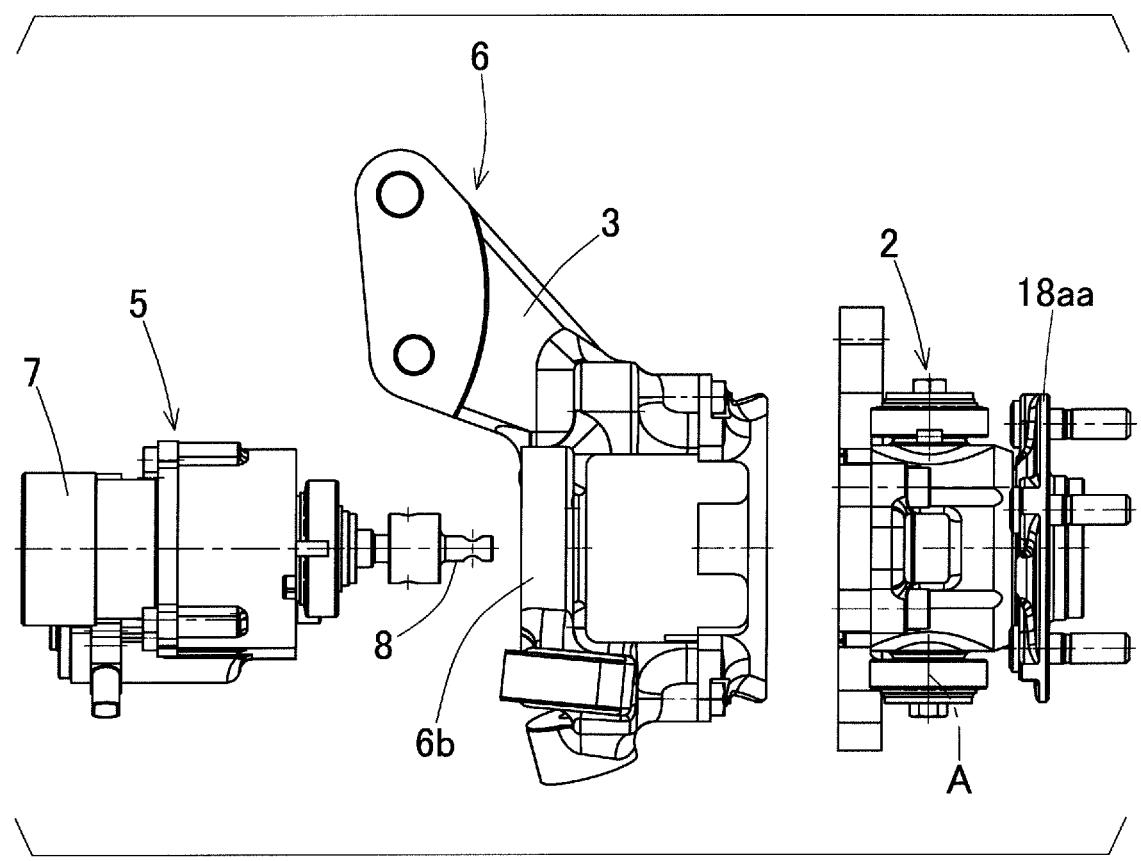
FIG. 11 is an exploded front view of the mechanism section of the second steering device.
Figure 12:
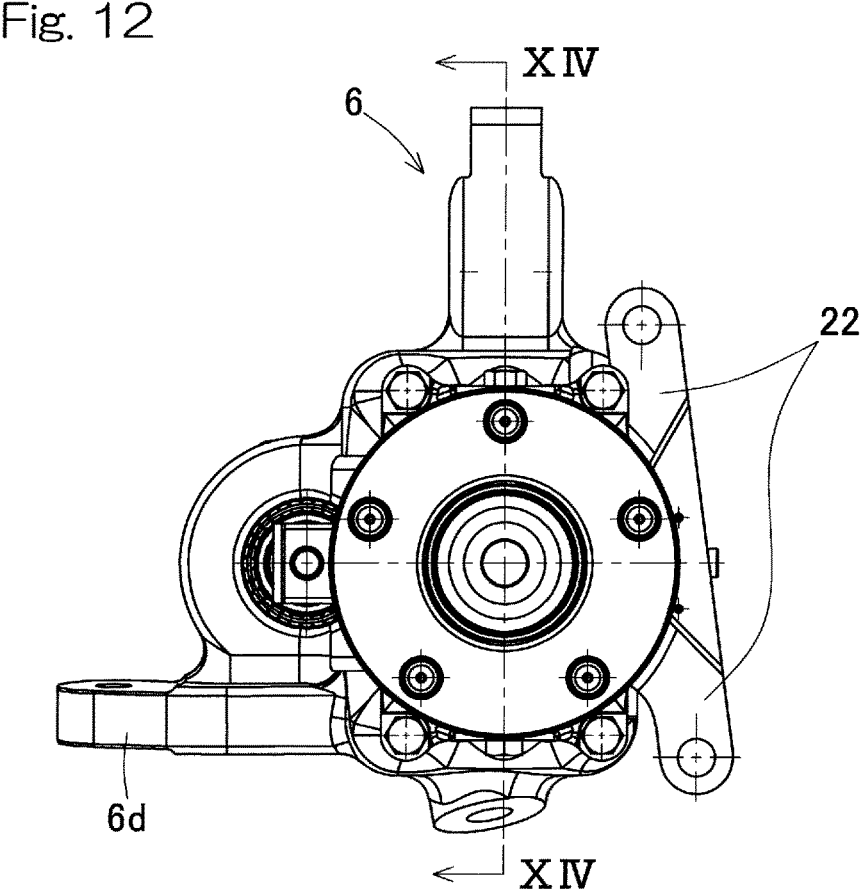
FIG. 12 is a side view of the mechanism section of the second steering device.

As shown in FIG. 11, an actuator main body 7 of the supplementary turning actuator 5 is disposed on an inboard side of the unit support member 3, and the hub unit main body 2 is disposed on an outboard side of the unit support member 3. The "outboard side" refers to an outer side in a widthwise direction of a vehicle in a state where the hub unit 1 (FIG. 7) is mounted in the vehicle, and the "inboard side" refers to an inner side in the widthwise direction of the vehicle.

Figure 10:
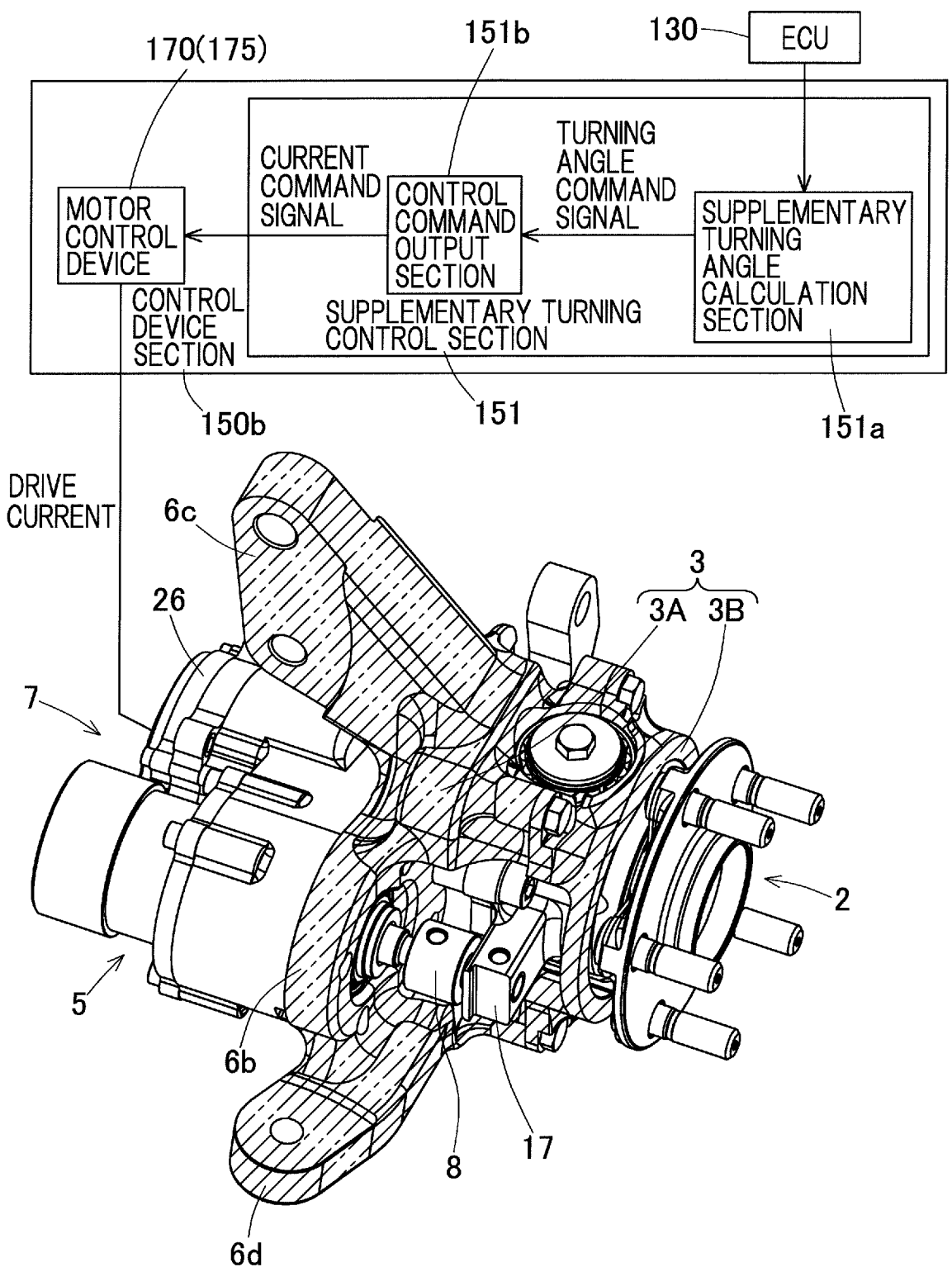
FIG. 10 is a perspective view illustrating an appearance of the mechanism section of the second steering device.

As shown in FIG. 8 and FIG. 10, the hub unit main body 2 and the actuator main body 7 are connected by a joint part 8. The joint part 8 is typically attached with a non-illustrated boot for protection against water and dust.

As shown in FIG. 7, the hub unit main body 2 is supported by the unit support member 3 through the rotation-permitting support components 4, 4 provided above and below the hub unit main body so as to be rotatable about the supplementary turning axis A extending in a vertical direction. The supplementary turning axis A is different from a rotation axis O of the wheel 9 and from a king pin axis about which the first steering device performs steering. A typical vehicle has a king pin angle in a range from 10 to 20 degrees in order to improve linear motion stability of vehicle travel. In this embodiment, the hub unit 1 has a turning axis having a different angle (axis) from the king pin angle. The wheel 9 includes a wheel body 9a and a tire 9b.

As shown in FIG. 1, the hub unit 1 (FIG. 7) of this embodiment is integrally provided with the chassis frame component 6 of the suspension device 12, as a mechanism for individually turning the left and right wheels by an angle of several degrees or less (about 5 degrees) in addition to steering of the right and left front wheels 9, 9 performed by the first steering device 11. Although the first steering device 11 is of a rack and pinion type, it may be of any type. Although the suspension device 12 is, for example, a strut type suspension mechanism in which a shock absorber is directly fixed to the chassis frame component 6, it may be of other type, such as a multi-link type suspension mechanism.

Hub Unit Main Body 2

As shown in FIG. 7, the hub unit main body 2 includes a hub bearing 15 for supporting the wheel 9, an outer ring 16, and an arm part 17 (FIG. 10) that is a steering-force receiving part described later.

As shown in FIG. 14, the hub bearing 15 includes an inner race 18, an outer race 19, and rolling elements 20 (such as balls) interposed between the inner and outer races 18, 19. The hub bearing serves to connect a member on a vehicle body side and a wheel 9 (FIG. 7).

In the illustrated example, the hub bearing 15 is an angular ball bearing in which the outer race 19 serves as a stationary ring, the inner race 18 serves as a rotary ring, and the rolling elements 20 are arranged in double rows. The inner race 18 includes: a hub axle part 18a that has a hub flange 18aa and forms a raceway surface on the outboard side; and an inner ring part 18b that forms a raceway surface on the inboard side. As shown in FIG. 7, the wheel body 9a of the wheel 9 is fixed to the hub flange 18aa by a bolt such that the wheel body 9a is overlapped with a brake rotor 21a. The inner race 18 rotates about a rotation axis O.

As shown in FIG. 14, the outer ring 16 includes: an annular part 16a fitted to an outer peripheral surface of the outer race 19; and the attachment shaft parts 16b, 16b each having a trunnion shaft shape, the attachment shaft parts being provided so as to protrude upwardly and downwardly from an outer periphery of the annular part 16a. Each of the attachment shaft parts 16b is provided so as to be coaxial with the supplemental turning axis A.

As shown in FIG. 8, a brake 21 includes the brake rotor 21a and a brake caliper 21b. The brake caliper 21b is mounted on two brake caliper attachment parts 22 (FIG. 12) at upper and lower portions that are integrally formed with the outer race 19 so as to protrude in an arm-like manner.

Rotation-Permitting Support Component and Unit Support Member

As shown in FIG. 14, each of the rotation-permitting support components 4 includes a rolling bearing. In this example, a tapered roller bearing is used as the rolling bearing. The rolling bearing includes an inner race 4a fitted to the outer periphery of the attachment shaft part 16b, an outer race 4b fitted to the unit support member 3, and a plurality of rolling elements 4c interposed between the inner and outer races 4a, 4b.

The unit support member 3 includes a unit support member main body 3A and a unit support member joint body 3B. The unit support member main body 3A has an outboard side end to which the unit support member joint body 3B having a substantially ring shape is removably fixed. The unit support member joint body 3B has an inboard side surface having upper and lower portions each formed with a fitting hole forming part 3a having a partially concaved spherical shape.

Figure 13:
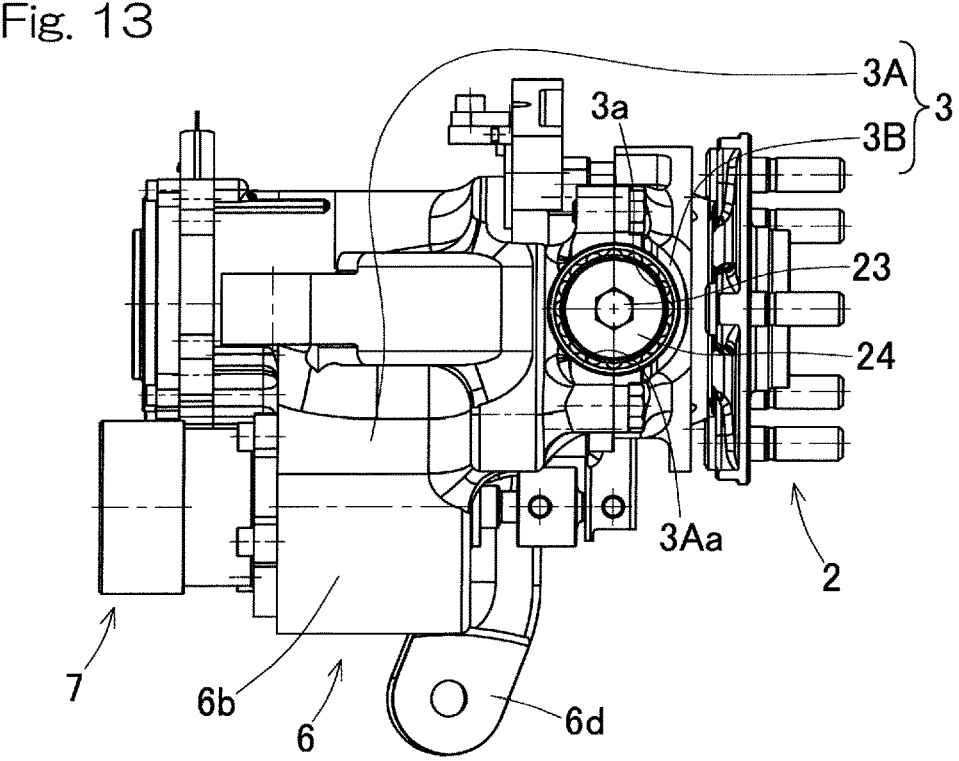
FIG. 13 is a plan view of the mechanism section of the second steering device.

As shown in FIG. 13 and FIG. 14, the unit support member main body 3A has the outboard side end having upper and lower portions each formed with a fitting hole forming part 3Aa having a partially concaved spherical shape. As shown in FIG. 10, the unit support member joint body 3B is fixed to the outboard side end of the unit support member main body 3A such that the respective fitting hole forming parts 3a, 3Aa are put together in the upper and lower portions (FIG. 13) to define fitting holes each arranging along a complete circumference. The outer race 4b is fitted into the fitting hole. It should be noted that in FIG. 10, the unit support member 3 is indicated by single dotted lines.

As shown in FIG. 14, each of the attachment shaft parts 16b of the outer ring 16 is formed with an internal thread portion extending in a radial direction, and a bolt 23 is screwed into the internal thread portion. Each of the rotation permitting support components 4 is preloaded by applying a pressing force to an end face of the inner race 4a by the bolt 23 screwed into the internal thread portion, with a pressing member 24 having a disk shape interposed on the end face of the inner race 4a. This makes it possible to improve rigidity of each of the rotation permitting support components 4. An initial load is set so as not to be released even where the weight of the vehicle acts on the hub unit 1. It should be noted that the rolling bearings of the rotation-permitting support components 4 are not limited to tapered roller bearings, they may be angular ball bearings depending on use conditions such as maximum load. Even in such a case, preload can be applied in the same way as described above.

As shown in FIG. 8, the arm part 17 serves as a point of application of a steering force applied to the outer race 19 of the hub bearing 15 and is integrally provided as a part of the outer periphery of the annular part 16a or a part of the outer periphery of the outer race 19 so as to protrude therefrom. The arm part 17 is rotatably coupled to a linear output part 25a of the supplemental turning actuator 5 through the joint part 8. This allows the linear output part 25a of the supplementary turning actuator 5 to advance/retreat so that the hub unit main body 2 is caused to rotate, i.e., to turn about the supplementary turning axis A (FIG. 7).

Supplementary Turning Actuator 5

As shown in FIG. 10, the supplementary turning actuator 5 includes an actuator main body 7 configured to rotationally drive the hub unit main body 2 about the supplementary turning axis A (FIG. 7).

As shown in FIG. 8, the actuator main body 7 includes a motor 26, a speed reducer or reduction gear 27 configured to reduce the speed of rotation (number of rotation per time) of the motor 26, and a linear motion mechanism 25 configured to convert a forward/reverse rotation output from the speed reducer 27 into a reciprocating linear motion of the linear output part 25a. The motor 26 is, for example, a permanent magnet synchronous motor, or may be a direct current motor or an induction motor.

The speed reducer 27 may be a winding-type transmission mechanism, such as a belt transmission mechanism, or a gear train. In the example of FIG. 8, a belt transmission mechanism is used. The speed reducer 27 includes a driving pulley 27a, a driven pulley 27b, and a belt 27c. The driving pulley 27a is coupled to a motor shaft of the motor 26, and the driven pulley 27b is disposed in the linear motion mechanism 25. The driven pulley 27b is disposed parallel to the motor shaft. A driving force of the motor 26 is transmitted from the driving pulley 27a to the driven pulley 27b through the belt 27c. The driving pulley 27a, the driven pulley 27b and the belt 27c form the speed reducer 27 of a winding type.

The linear motion mechanism 25 may be a feed screw mechanism, such as a sliding screw and a ball screw, or a rack and pinion mechanism. In this example, a feed screw mechanism with a trapezoid sliding screw is used as a feed screw mechanism that also serves as a reverse input prevention mechanism 25b. Since the linear motion mechanism 25 includes the feed screw mechanism with the trapezoid sliding screw as the reverse input prevention mechanism 25b, the effects of preventing a reverse input from the tire 9b can be enhanced. The actuator main body 7 including the motor 26, the speed reducer 27 and the linear motion mechanism 25 is assembled as a semi-assembled product and is removably mounted to a casing 6b by e.g. a bolt. It is also possible to use a mechanism that directly transmits a driving force from the motor 26 to the linear motion mechanism 25 without involving a speed reducer. It is also possible to use, for example, a worm drive as the reverse input prevention mechanism 25b and a component (e.g. a ball screw) that does not have a reverse-input prevention function as the linear motion mechanism 25.

The casing 6b is integrally formed with the unit support member main body 3A as a part of the unit support member 3. The casing 6b is formed in a bottomed cylindrical shape and includes a motor receiving part for supporting the motor 26 and a linear motion mechanism receiving part for supporting the linear motion mechanism 25. The motor receiving part is formed with a fitting hole for supporting the motor 26 at a predetermined position inside the casing. The linear motion mechanism receiving part is formed with a fitting hole for supporting the linear motion mechanism 25 at a predetermined position inside the casing and a through-hole for allowing the linear output part 25a to advance and retreat, for example.

As shown in FIG. 10, the unit support member main body 3A includes: the casing 6b; a shock absorber attachment part 6c that serves as an attachment part for a shock absorber; and a steering device joint part 6d that serves as a joint part for the first steering device 11 (FIG. 8). The shock absorber attachment part 6c and the steering device joint part 6d are also integrally formed with the unit support member main body 3A. The shock absorber attachment part 6c is formed in a protruding manner on an upper portion of an outer surface part of the unit support member main body 3A. The steering device joint part 6d is formed in a protruding manner on a side surface portion of the outer surface part of the unit support member main body 3A.

Although the unit support member 3 is integrally formed with the knuckle in this example, a unit support member that is produced as a separate component may be integrally fixed to a knuckle.

Although the embodiment is described with reference to the case where a command of a steering command angle $\delta_h$ in the first steering device 11 is given by the steering wheel 200, a command of a steering command angle $\delta_h$ may be given by an automatic drive device (not illustrated). Also, as long as the first steering device 11 is configured to move the right and left front wheels 9, 9 in a mechanically associated manner, it may be a steer-by-wire system configured to drive a turning actuator (not illustrated) in response to an operation of the steering wheel 200.

Although the preferred embodiments of the present invention have been described with reference to the drawings, various additions, modifications, or deletions may be made without departing from the scope of the invention. Accordingly, such variants are included within the scope of the present invention.

REFERENCE NUMERALS

2 . . . Hub unit main body
3 . . . Unit support member
5 . . . Supplementary turning actuator
6 . . . Chassis frame component
9 . . . Wheel
11 . . . First steering device
12 . . . Suspension device
15 . . . Hub bearing
25b . . . Reverse input prevention mechanism
100 . . . Steering system
101 . . . Vehicle
105 . . . Tire housing
110 . . . Vehicle information detection section
150 . . . Second steering device
150a . . . Mechanism section
150b . . . Control device section
151 . . . Supplementary turning control section
151a . . . Supplementary turning angle calculation section
151b . . . Control command output section
170, 175 . . . Motor control device
200 . . . Steering wheel

What is claimed is:

1. A steering system comprising:
a first steering device configured to change an angle of left and right chassis frame components of a suspension device to which left and right wheels that serve as front wheels of a vehicle are mounted so as to steer the left and right wheels that serve as the front wheels of the vehicle in accordance with a steering command angle given by rotation of a steering wheel or an electrical signal, the left and right wheels being mechanically associated with each other;
a second steering device configured to drive a supplementary turning actuator provided to each of the left and right wheels to change angles of the wheels relative to the chassis frame components and thereby individually turn the left and right wheels; and
a vehicle information detection section configured to detect vehicle information including a vehicle velocity of the vehicle and the steering command angle,
wherein the second steering device includes a supplementary turning control section configured to control the supplementary turning actuator so as to perform turning by a steering angle $\delta_2$ for auxiliary turning that is a difference between a steering angle of the front wheels, determined by a numerical model of vehicle motion on the basis of the information on the steering command angle and the vehicle velocity, and an actual steering angle of the front wheels steered by the first steering device,
wherein the following equation using a two-wheel model is used in a control, in which the steering angle $\delta_2$ for auxiliary turning is calculated by the supplementary turning control section of the second steering device and is used for turning,

[Math 1]

$$\frac{\delta_2}{\delta_h}(s) = \frac{1}{n}\left[-\left[\frac{\frac{2\zeta}{\omega_n}\left(\alpha_1 - \alpha_2 - \frac{1}{\zeta\omega_n}\alpha_2 s\right)s}{1 + \frac{2\zeta}{\omega_n}s + \frac{1}{\omega_n^2}s^2}\right] + \left[\frac{\left(\frac{l_r}{V_{\beta=0}}\alpha_3 + \frac{l_r}{V}(1-\alpha_3)\right)s}{1 + \frac{l_r}{V}s + \frac{l}{2lK_r}s^2}\right]\right]$$

where
$\delta_2$: steering angle for auxiliary turning calculated as difference
$\delta_h$: steering command angle
V: vehicle velocity
$V_{\beta=0}$: vehicle velocity when skid angle β relative to steering angle is zero n: ratio between steering command angle and steering angle of front wheel
ζ: damping ratio
$\omega_n$: natural frequency (natural frequency of vehicle)
$\alpha_1, \alpha_2, \alpha_3$: parameter
$k_r$: tire cornering power per one rear wheel
$l_r$: distance between center of gravity of vehicle and rear wheel axle
l: distance between front wheel axle and rear wheel axle ($l_f+l_r$)
I: yaw moment of inertia of vehicle
s: complex variable in the Laplace transform.

2. A steering system comprising:
a first steering device configured to change an angle of left and right chassis frame components of a suspension device to which left and right wheels that serve as front wheels of a vehicle are mounted so as to steer the left and right wheels that serve as the front wheels of the vehicle in accordance with a steering command angle given by rotation of a steering wheel or an electrical signal, the left and right wheels being mechanically associated with each other;
a second steering device configured to drive a supplementary turning actuator provided to each of the left and right wheels to change angles of the wheels relative to the chassis frame components and thereby individually turn the left and right wheels; and
a vehicle information detection section configured to detect vehicle information including a vehicle velocity of the vehicle and the steering command angle,
wherein the second steering device includes a supplementary turning control section configured to control the supplementary turning actuator so as to perform turning by a steering angle $\delta_2$ for auxiliary turning that is a difference between a steering angle of the front wheels, determined by a numerical model of vehicle motion on the basis of the information on the steering command angle and the vehicle velocity, and an actual steering angle of the front wheels steered by the first steering device,
wherein the following equation is used in a control in which the steering angle for auxiliary turning is calculated by the supplementary turning control section of the second steering device and is used for turning,

[Math 2]

$$\delta_{hb} = \left[\frac{1}{2}(k_1 - k_2) + \alpha(k_1 + k_2)\frac{lh}{l_r d}a_y\right]\delta$$

where $$k_1 = \left(1 - \frac{1 - B\frac{l_r}{l}V^2}{1 + AV^2 - \frac{d}{2l}\delta}\right), \quad k_2 = \left(1 - \frac{1 - B\frac{l_r}{l}V^2}{1 + AV^2 - \frac{d}{2l}\delta}\right)$$

$$A = -\frac{m}{2l^2}\frac{l_f K_f - l_r K_r}{K_f K_r}, \quad B = -\frac{ml_f}{2ll_r K_r}$$

where
δ: steering angle of front wheel
$\delta_{hb}$: hub steering angle (right)
$\delta_{hb}$: hub steering angle (left)
d: tread
I: distance between front wheel axle and rear wheel axle ($l_f+l_r$)
h: height of center of gravity from the ground
α: front-axle lateral load transfer rate (parameter),
m: inertial mass of vehicle
V: vehicle velocity
$Y_{f1}, Y_{f2}, Y_{r1}, Y_{r2}$: cornering force of respective wheels
r: yaw rate or yaw angular velocity of vehicle
β: skid angle of center of gravity of vehicle
$\beta_{f1}, \beta_{f2}, \beta_{r1}, \beta_{r2}$: skid angle of respective wheels
I: yaw moment of inertia of vehicle
$l_f$: distance between center of gravity of vehicle and front wheel axle
$l_r$: distance between center of gravity of vehicle and rear wheel axle
$K_f, K_r$ denote tire cornering power per one front wheel and one single rear wheel, respectively,
$\delta_{2L}$: left wheel angle
$\delta_{2R}$: right wheel angle
n: ratio (gear ratio) of steering-wheel angle to steering angle of front wheel
W: vehicle weight
ΔW: front-wheel lateral load transfer amount
s: complex variable in the Laplace transform.

3. The steering system as claimed in claim 2, wherein the supplementary turning control section is configured to control the supplementary turning actuator so as to perform turning by individual steering angles ($\delta_{2L}, \delta_{2R}$) for auxiliary turning, each of the individual steering angles being a difference between a steering angle of each of the left and right front wheels determined by the numerical model of vehicle motion and an actual steering angle of each of the left and right front wheels steered by the first steering device.

4. A steering system comprising:
a first steering device configured to change an angle of left and right chassis frame components of a suspension device to which left and right wheels that serve as front wheels of a vehicle are mounted so as to steer the left and right wheels that serve as the front wheels of the vehicle in accordance with a steering command angle given by rotation of a steering wheel or an electrical signal, the left and right wheels being mechanically associated with each other;
a second steering device configured to drive a supplementary turning actuator provided to each of the left and right wheels to change angles of the wheels relative to the chassis frame components and thereby individually turn the left and right wheels; and
a vehicle information detection section configured to detect vehicle information including a vehicle velocity of the vehicle and the steering command angle, wherein
the second steering device includes a supplementary turning control section configured to control the supplementary turning actuator so as to perform turning by a steering angle $\delta_2$ for auxiliary turning that is a difference between a steering angle of the front wheels, determined by a numerical model of vehicle motion on the basis of the information on the steering command angle and the vehicle velocity, and an actual steering angle of the front wheels steered by the first steering device,
wherein the second steering device includes a hub unit main body having a wheel-mount hub bearing and a unit support member configured to be connected to each of the chassis frame components or be formed as a part of each of the chassis frame components, and the hub unit main body is supported by the unit support member through a rotation-permitting support component so as to be rotatable about a supplementary turning axis extending in a vertical direction, the supplementary turning axis being different from a king pin that is a rotation axis of the corresponding wheel, and is configured to be caused to rotate about the supplementary turning axis by driving the supplementary turning actuator.

5. The steering system as claimed in claim 2, wherein the second steering device is a supplementary turning function-equipped hub unit including:
   a mechanism section including a hub unit main body having a wheel-mount hub bearing, and a unit support member configured to be connected to each of the chassis frame components or be formed as a part of each of the chassis frame components and support the hub unit main body such that an angle of the hub unit main body can be changed relative to each of the chassis frame components; and
   a control device section including the supplementary turning control section and a motor control device configured to output a drive current in accordance with a motor command signal outputted by the supplementary turning control section to drive the supplementary turning actuator.

6. The steering system as claimed in claim 2, wherein the supplementary turning actuator of the second steering device includes a reverse input prevention mechanism.

7. A vehicle comprising a steering system as claimed in claim 2.

8. The steering system as claimed in claim 1, wherein the supplementary turning control section is configured to control the supplementary turning actuator so as to perform turning by individual steering angles ($\delta_{2L}$, $\delta_{2R}$) for auxiliary turning, each of the individual steering angles being a difference between a steering angle of each of the left and right front wheels determined by the numerical model of vehicle motion and an actual steering angle of each of the left and right front wheels steered by the first steering device.

9. The steering system as claimed in claim 1, wherein the second steering device is a supplementary turning function-equipped hub unit including:
   a mechanism section including a hub unit main body having a wheel-mount hub bearing, and a unit support member configured to be connected to each of the chassis frame components or be formed as a part of each of the chassis frame components and support the hub unit main body such that an angle of the hub unit main body can be changed relative to each of the chassis frame components; and
   a control device section including the supplementary turning control section and a motor control device configured to output a drive current in accordance with a motor command signal outputted by the supplementary turning control section to drive the supplementary turning actuator.

10. The steering system as claimed in claim 1, wherein the supplementary turning actuator of the second steering device includes a reverse input prevention mechanism.

11. A vehicle comprising a steering system as claimed in claim 1.

* * * * *

UNITED STATES PATENT AND TRADEMARK OFFICE
CERTIFICATE OF CORRECTION

PATENT NO. : 11,459,029 B2
APPLICATION NO. : 17/025176
DATED : October 4, 2022
INVENTOR(S) : Norio Ishihara et al.

Page 1 of 1

It is certified that error appears in the above-identified patent and that said Letters Patent is hereby corrected as shown below:

In the Claims

Column 21, Line 55-58:
In Claim 2, delete "$k_2 = \left(1 - \dfrac{1 - B\dfrac{l_r}{l}V^2}{1 + AV^2 - \dfrac{d}{2l}\delta}\right)$" and insert -- $k_2 = \left(1 - \dfrac{1 - B\dfrac{l_r}{l}V^2}{1 + AV^2 + \dfrac{d}{2l}\delta}\right)$ --.

Column 22, Line 1:
In Claim 2, delete "I:" and insert --l:--.

Column 22, Line 7:
In Claim 2, delete "$Y_{f1}$" and insert --$Y_{f1}$,--.

Column 22, Line 7:
In Claim 2, delete "$Y_{r1}$" and insert --$Y_{r1}$,--.

Column 22, Line 10:
In Claim 2, delete "$B_{f2}, B_{r1}, B_{r2}$:" and insert --$\beta_{f2}, \beta_{r1}, \beta_{r2}$:--.

Column 22, Line 11:
In Claim 2, delete "l:" and insert --I:--.

Column 22, Line 16:
In Claim 2, delete "$K_r$," and insert --$K_r$--.

Signed and Sealed this
Twenty-fifth Day of June, 2024

Katherine Kelly Vidal
*Director of the United States Patent and Trademark Office*